United States Patent
Cink

(10) Patent No.: US 9,450,301 B2
(45) Date of Patent: Sep. 20, 2016

(54) PEST CONTROL APPARATUS AND SYSTEM HAVING AN ELECTROMAGNETIC ATTRACTING OR REPELLING DEVICE AND HOUSING THEREFOR

(75) Inventor: James H. Cink, Ballwin, MO (US)

(73) Assignee: BASF Corporation, Florham Park, NJ (US)

( * ) Notice: Subject to any disclaimer, the term of this patent is extended or adjusted under 35 U.S.C. 154(b) by 190 days.

(21) Appl. No.: 13/259,998

(22) PCT Filed: Apr. 13, 2010

(86) PCT No.: PCT/US2010/030845
§ 371 (c)(1),
(2), (4) Date: Dec. 8, 2011

(87) PCT Pub. No.: WO2010/120743
PCT Pub. Date: Oct. 21, 2010

(65) Prior Publication Data
US 2012/0085020 A1    Apr. 12, 2012

Related U.S. Application Data

(60) Provisional application No. 61/169,163, filed on Apr. 14, 2009.

(51) Int. Cl.
*A01M 1/02* (2006.01)
*H01Q 1/42* (2006.01)
*A01M 29/28* (2011.01)

(52) U.S. Cl.
CPC ................ *H01Q 1/42* (2013.01); *A01M 1/023* (2013.01); *A01M 1/026* (2013.01); *A01M 29/28* (2013.01); *A01M 2200/011* (2013.01)

(58) Field of Classification Search
CPC ........ A01M 1/00; A01M 1/02; A01M 1/103; A01M 1/2005

USPC ................. 43/132.1, 124, 131, 107
IPC .................... A01M 1/00,1/02, 17/00
See application file for complete search history.

(56) References Cited

U.S. PATENT DOCUMENTS 6,100,805 A * 8/2000 Lake ..................... A01M 1/026
340/540
6,370,812 B1 * 4/2002 Burns et al. .................... 43/124
(Continued)

FOREIGN PATENT DOCUMENTS

DE     19815916 A1   11/1998
JP     60-207540 A   10/1985
(Continued)

OTHER PUBLICATIONS

English-language translation of WO 03/081999 A1.*
(Continued)

*Primary Examiner* — Lisa Tsang
(74) *Attorney, Agent, or Firm* — Armstrong Teasdale LLP

(57) ABSTRACT

A method of controlling pests includes placing a pest control station in an area of interest. The pest control station includes an internal chamber. The method includes placing a pest control apparatus within the internal chamber of the pest control station. The pest control apparatus has a transmitting device including an antenna and a housing sealingly enclosing the antenna. The housing substantially isolates the antenna from the environment. The method also includes activating the antenna of the transmitting device to emit an electromagnetic field to define a region of influence. The housing of the transmitting device is made from a material that reduces the region of influence of the antenna by less than 50%.

20 Claims, 24 Drawing Sheets

(56) References Cited

U.S. PATENT DOCUMENTS

| | | | |
|---|---|---|---|
| 6,631,583 B2* | 10/2003 | Rollins | 43/124 |
| 6,837,001 B2* | 1/2005 | Amburgey et al. | 43/132.1 |
| 6,860,062 B2* | 3/2005 | Spragins | 43/121 |
| 6,990,769 B2* | 1/2006 | Wright | 43/132.1 |
| 7,086,196 B2* | 8/2006 | Cink et al. | 43/132.1 |
| 7,218,234 B2* | 5/2007 | Tirkel | 340/573.2 |
| 8,258,966 B2* | 9/2012 | Wright | A01M 1/026 340/573.2 |
| 8,454,985 B2* | 6/2013 | Eger, Jr. | A01M 1/026 424/405 |
| 2003/0001745 A1 | 1/2003 | Barber et al. | |
| 2003/0088968 A1 | 5/2003 | Noda | |
| 2003/0128119 A1 | 7/2003 | Lake et al. | |
| 2003/0177689 A1* | 9/2003 | Su | 43/131 |
| 2006/0162236 A1* | 7/2006 | French | 43/132.1 |
| 2007/0068067 A1 | 3/2007 | Ragon et al. | |
| 2007/0091007 A1 | 4/2007 | Sako | |
| 2007/0107297 A1* | 5/2007 | Wijenberg et al. | 43/107 |
| 2007/0137096 A1 | 6/2007 | Ragon et al. | |
| 2009/0000181 A1 | 1/2009 | Cink | |
| 2009/0188155 A1* | 7/2009 | Tolley | A01M 1/026 43/131 |

FOREIGN PATENT DOCUMENTS

| | | | |
|---|---|---|---|
| JP | 08-195687 A | 7/1996 | |
| JP | 10-229305 | 8/1998 | |
| JP | 11-214209 A | 8/1999 | |
| JP | 2003-284891 | 10/2003 | |
| JP | 2004-537993 A | 12/2004 | |
| WO | WO 03081999 A1 * | 10/2003 | A01M 1/20 |
| WO | 2008063939 A2 | 5/2008 | |

OTHER PUBLICATIONS

English-language translation of JP 11-214209.*

International Search Report and Written Opinion of PCT/US2010/030845, dated Aug. 4, 2010, 12 pages.

Notice of Reasons for Rejection for JP Application No. 2012-506121, dated Nov. 12, 2013, 7 pages.

Final Rejection for Japenese Application No. 2012-506121, dated Jun. 10, 2014, 2 pages.

Office Action for JP Patent application No. 2014-205329 4 pages.

* cited by examiner

PEST CONTROL APPARATUS AND SYSTEM HAVING AN ELECTROMAGNETIC ATTRACTING OR REPELLING DEVICE AND HOUSING THEREFOR

CROSS-REFERENCE TO RELATED APPLICATION

This application claims the benefit of U.S. Provisional Application No. 61/169,163 filed Apr. 14, 2009, which is incorporated herein in its entirety.

BACKGROUND

The field of this invention relates generally to pest control apparatus and systems, and more particularly to a pest control apparatus and system having an electromagnetic attracting and/or repelling transmitting device and a housing for sealingly enclosing the transmitting device therein.

BRIEF DESCRIPTION

Termites are a serious threat throughout much of the world to structures or other objects containing wood or other cellulose containing components because they consume cellulose for nutrition. Subterranean termites, which typically dwell in the soil, often form large colonies. Members of the colony forage for food and thus burrow galleries or passageways in the soil outwardly from the nest. Portions of the food located by the foraging termites are returned to the nest. Termites are also known to possess means for communicating the location of a food source to other termites within the colony.

Many termite control devices are known and formed in a wide variety of configurations to monitor and eradicate the termites. One type of popular termite control device utilizes a monitoring food source made from a medium that is attractive to termites to encourage the termites to begin feeding from the device. The termites are then eliminated by providing a toxicant-containing bait placed at the feeding point in the termite control device. Perhaps most important, termite baiting results in the elimination or suppression of the entire termite colony, not just the members of the colony that reach the station site, because the toxicant-containing bait is brought to the nest with the returning termites. Because termite bait must be consumed by termites in order to be effective, a technique must be developed to consistently and repeatedly make the bait available for consumption by members of a termite colony at a fixed point over a long enough period of time for the bait to have the intended toxic effect on the colony.

Typically, the toxic termite bait is applied only after contact has been established with a termite colony and termites are feeding from the station. Reasons for this include minimization of the amount of bait used, potential deterioration of bait if it is left in place for long periods of time in anticipation of prospective termite attack, minimization of the potential for unintended exposure of children and pets to the bait, etc. Therefore, it is preferable to first detect termites at the bait holder with a nontoxic medium while monitoring the site. After termites are detected, the toxic bait is applied to the bait holder.

Thus, many conventional termite monitoring and eradicating systems are reactive in that the termites are controlled by using toxic bait only after the termites have been detected at or in close proximity to the structure for which protection from the termites is sought. As a result, the termites can potentially cause damage to the structure prior to their detection and, even after their detection, prior to the toxic bait fully eradicating the colony.

As mentioned above, the stations used to monitor and eradicate termites are often baited to draw the termites into the stations. Since the stations are typically installed in close proximity to the structure being protected, the termites are actually drawn into close proximity to the structure.

It has been found that electromagnetic transmitting devices operating within specific ranges of frequencies can be used to attract or repel termites from desired structures. As a result, termites can be repelled from the structure or attracted to a location remote from the structure using these transmitting devices. However, known transmitting devices typically comprise an exposed antenna, which leaves the antenna susceptible to degradation. These antennas, which are often metal rods, can oxidize, short out, be subject to fungi growth, or be damaged by insects or other pests, which may cause the antennas to fail or operate incorrectly. Encapsulation of these antennas may, however, prevent or severely adversely affect the range of the electromagnetic field being emitted by the transmitting device.

The transmitting device also comprises a transmitter operatively connected to the antenna. The transmitter when placed adjacent to or in close proximity to the antenna such that it too is exposed to the environment will also undesirably deteriorate as a result of weathering and other environmental factors (i.e., moisture, fungi, bugs, etc.).

SUMMARY

In one aspect, a transmitting device for use in a pest control station generally comprising an antenna and a housing sealingly enclosing the antenna therein.

In another aspect, a pest control system generally comprises a transmitter and a transmitting device. The transmitting device has an antenna and a housing sealingly enclosing the antenna therein.

In yet another aspect, a pest control system generally comprises pest control apparatus having a transmitting device adapted to emit an electromagnetic field at a selected frequency and to define a region of influence in which the electromagnetic field is emitted. The transmitting device includes an antenna and a housing sealing the antenna. The housing is made from a material that reduces the region of influence by less than 50%.

BRIEF DESCRIPTION OF THE DRAWINGS

Corresponding reference characters indicate corresponding parts throughout the several views of the drawings.

DETAILED DESCRIPTION OF THE DRAWINGS

Figure 1:
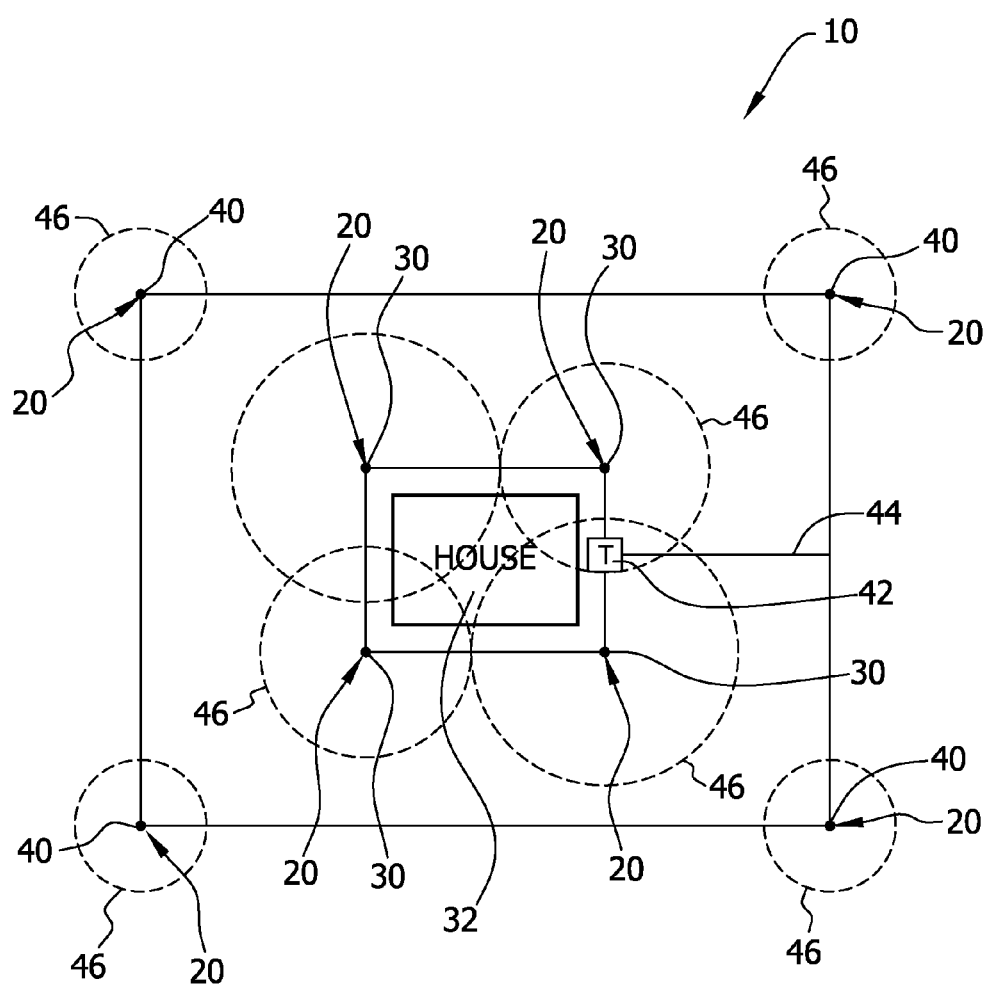
FIG. 1 is a schematic of one embodiment of a pest control system adapted to emit electromagnetic fields for repelling and/or attracting insects.

FIG. 1 illustrates one embodiment of a pest control system, indicated generally at 10, having a plurality of pest control apparatus, indicated generally at 20. In one configuration, the pest control apparatus 20 comprise a plurality of repelling stations 30 adapted to electromagnetically repel insects (e.g., ants, termites). While the pest control system 10 is illustrated and described herein in connection with controlling insects, it is understood that the pest control system may be used to control other invertebrate pests, such as other insects and arthropods, as well as vertebrate pests such as rodents, without departing from the scope of this invention. In the illustrated embodiment, four repelling stations 30 are located around the perimeter of a house 32 to repel termites from the house. The repelling stations 30 can be used to drive termites already present in the house 32 away from the house or to prevent termites from entering the housing in the first place. It is understood that more or fewer repelling stations 30 can be placed around the house 32 and that one or more of the repelling stations can be placed in the house. It is also understood that the repelling stations 30 can be used to repel insects from other structures or areas of interest besides a house.

In another configuration, the pest control apparatus 20 comprises a plurality of attracting stations 40 adapted to electromagnetically attract insects thereto. In the illustrated embodiment, four attracting stations 40 are disposed at locations spaced from the house 32 to attract termites away from the house. The attracting stations 40 can be used to draw termites already present in or near the house 32 away from the house or to prevent termites from approaching the housing. It is understood that more or fewer attracting stations 40 can be used. It is also understood that the attracting stations 40 can be used to attract insects away from other structures or areas of interest besides a house.

The illustrated configuration of the pest control system 10 comprises the plurality of repelling stations 30 and the plurality of attracting stations 40 but it is contemplated that the insect control system can comprise only repelling stations 30 or only attracting stations 40. That is, the repelling stations 30 can be used without the attracting stations 40 and the attracting stations can be used without the repelling stations.

It has been found that termites can be attracted to a location by emitting electromagnetic fields having a frequency less than about 4000 Hz from that location and repelled from a location by emitting electromagnetic fields having a frequency between about 4000 Hz and 6000 Hz from that location. See, e.g., U.S. Patent Application Publication No. 2007/0137096 entitled TERMITE CONTROL SYSTEM, METHOD AND APPARATUS; U.S. Patent Application Publication No. 2007/0068067 entitled TERMITE CONTROL METHODS AND APPARATUS; and U.S. Pat. No. 6,837,001 entitled POSITIVE DIRECTED MOVEMENT OF TERMITES BY RADIO WAVES AS A BASIS FOR CONTROL PROCEDURES, each of these being incorporated herein by reference in their entirety.

Accordingly, each of the repelling stations 30 of the illustrated insect control system 10 can be adapted to emit an electromagnetic field having a frequency less than about 4000 Hz and each of the attracting stations 40 can be adapted to emit an electromagnetic field having a frequency between about 4000 Hz and 6000 Hz. The repelling stations 30 (or attracting station 40) may be adapted to emit an electromagnetic field having the same frequency as each of the other stations or one or more stations may emit an electromagnetic field at a different frequency. It is also contemplated that the single repelling station 30 (or attracting station 40) may be adapted to emit electromagnetic fields at more than one frequency.

The electromagnetic field emitted from each of the repelling stations 30 and each of the attracting stations 40 has a region of influence 46 in which the electromagnetic field is emitted. The strength of the electromagnetic filed can be altered to vary the size of region of influence 46 of the electromagnetic field for each of the repelling stations 30 and attracting stations 40. Three different sized regions of influence 46 are illustrated in FIG. 1.

The pest control system 10 further comprises a transmitter 42 and wiring 44 electrically connecting the transmitter to each of the repelling stations 30 and each of the attracting stations 40 (FIG. 1). The transmitter 42 may be any suitable known transmitter. In one embodiment, the wiring 44 comprises insulated wire. The wiring 44 may or may not be run through a conduit. It has been found that the wiring 44 may also repel/attract insects. If it is desired to prevent the wiring 44 from repelling or attracting the insects thereto, the wiring 44 can be run through a suitable conduit, which would shield the wiring and prevents it from attracting or repelling insects to or from the wiring. Suitable conduit, for example, can be made from plastic or steel. In another embodiment, the wiring 44 can be exposed (i.e., not ran through a conduit) if it is desired to have the wiring potentially repel or attract insects to it.

It is contemplated that the pest control system 10 can comprise more than one transmitter 42. For example, one transmitter 42 may be provided to transmit signals to each of the repelling stations 30 and another transmitter may be provided to transmit signals to each of the attracting stations 40. In another example, one transmitter 42 may be provided to transmit signals to each of the repelling stations 30 and attracting stations 40 within a given region (e.g., the two repelling stations 30 and two attracting stations 40 to the right of the house 32 as viewed in FIG. 1), and another transmitter may be provided to transmit signals to each of the repelling stations and attracting stations within a different region (e.g., the two repelling stations and two attracting stations to the left of the house as viewed in FIG. 1).

In still another example, a transmitter 42 can be provided for each of the repelling stations 30 and attracting stations 40. In this example, a suitable power supply (i.e., a solar panel, rechargeable battery, disposable battery) can be provided with each of the transmitters 42 to supply electrical energy thereto. Moreover, the transmitter 42 and power supply can be placed within or adjacent to the associated repelling station 30 or attracting station 40.

Figure 2:
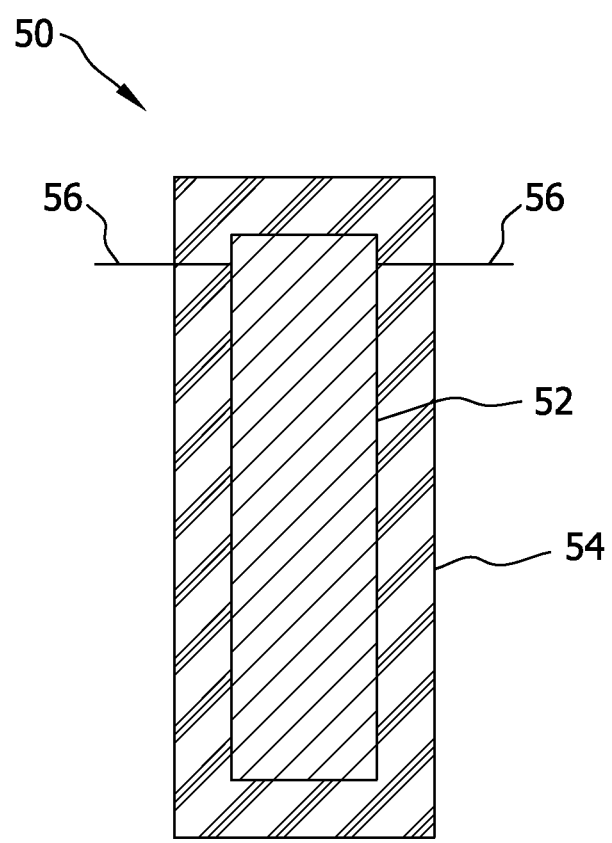
FIG. 2 is a vertical section of one embodiment of a transmitting device of the pest control system, the device having an antenna and a housing encapsulating the antenna.

Each of the repelling stations 30 and each of the attracting stations 40 include a transmitting device, indicated generally at 50 in FIG. 2, for receiving the electrical signal from the transmitter 42 via wiring 44 and, in response, emitting the electromagnetic field. As illustrated in FIG. 2, each of the transmitting devices 50 include an antenna 52 and a housing 54 for hermetically sealing the antenna. The housing 54 protects the antenna 52, which is susceptible to degradation, from the environment. For example, the housing 54 is adapted to protect the antenna 52 from insects, weathering, and fungi. The housing 54 can also be adapted to protect the power supply and/or the transmitter 42 if designated power supplies and transmitters are provided for one or more of the repelling stations 30 and attracting stations 40.

The antenna 52 is hermetically sealed within the housing 54. In one embodiment, which is illustrated in FIG. 2, the antenna 52 is completely and permanently encased within the housing 54. In other words, the antenna 52 and housing 54 are intended to remain as a single, inseparable unit throughout the life of the antenna 52. In this embodiment, the transmitting device 50 can be made by overmolding the housing 54 onto the antenna 52 using any known overmolding technique. It is understood that the housing 54 can be formed separately from the antenna 52 and that the antenna can be placed into and sealed within the housing. It is also understood that the housing 54 can be oversized with respect to the antenna 54 so that the antenna can be placed loosely into the housing.

Leads 56, which may or may not be insulated, extend through the housing 54 for electrically coupling the antenna 52 to the wiring 44. The leads 56 can be coupled to the wiring 44 using any suitable electrical fasteners (not shown). In one suitable embodiment, the electrical fasteners allow the leads to be releasably coupled to the wiring 44 to facilitate replacement of the transmitting device 50 (and housing 54 of the embodiment of FIG. 2). Being able to easily change out the transmitting device 50 is advantageous in replacing a broken transmitting device with a new one or removing the existing transmitting device with one having a different operating frequency. The leads 56 can be omitted in an embodiment wherein the power supply, transmitter 42, and transmitting device 52 are contained as an assembly within the housing 54.

Figure 3:
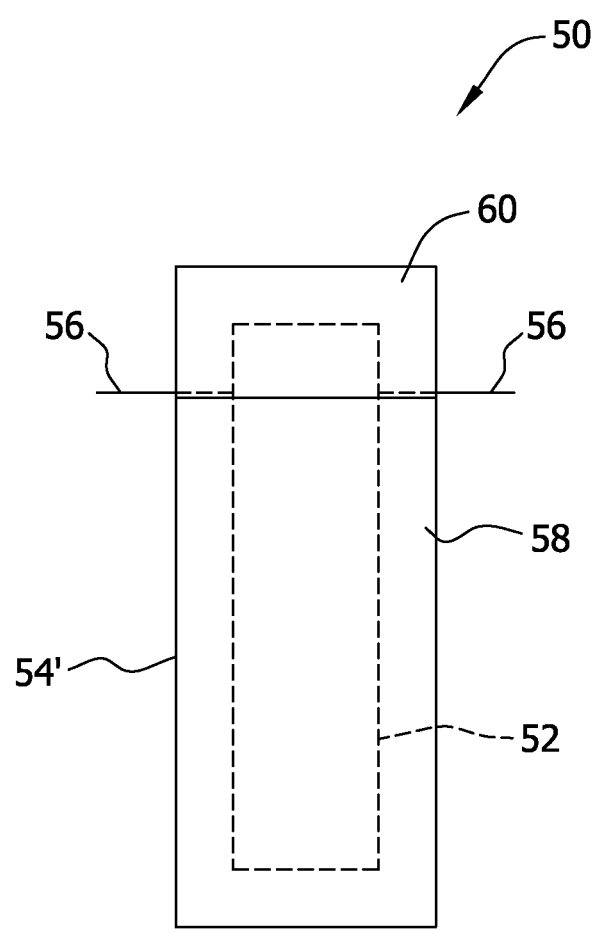
FIG. 3 is a side elevation of another embodiment of a transmitting device of the pest control system, the device having an antenna and a housing sealingly enclosing the antenna.
Figure 4:
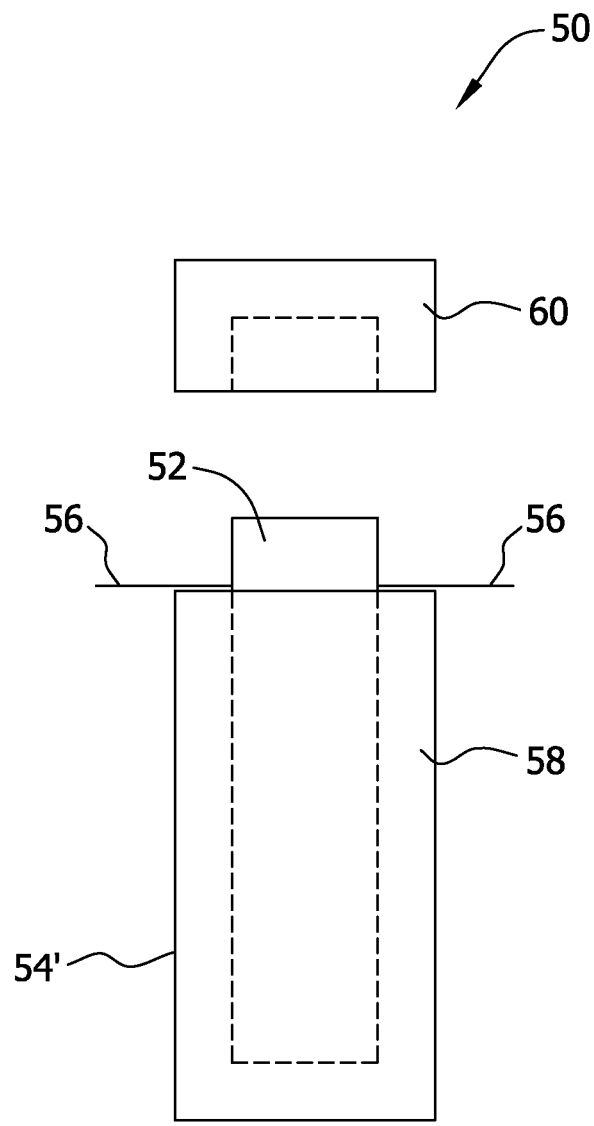
FIG. 4 is a side elevation of the transmitting device of FIG. 3 with a cap of the housing removed to provide access to the antenna.

In another embodiment, which is illustrated in FIGS. 3 and 4, the antenna 52 of the transmitting device 50 can be selectively, sealingly enclosed within a housing 54' having a body 58 and a closure 60 removably attached to the body. FIG. 3 illustrates the closure 60 attached to the body 58 and FIG. 4 illustrates the closure removed from the body 58. The closure 60 can be removably attached to the body 58 in any suitable manner (e.g., threaded connection, snap-fit). It is also contemplated that the closure 60 can be hinged to the body 58 so that access to the antenna 52 can be gained without completely removing the closure from the body. In this embodiment, the closure 60 can be pivoted relative to the body 54 between a closed position wherein the antenna 52 is sealing enclosed by the housing 54' and an opened position wherein the antenna is at least partially exposed.

As in the previous embodiment (seen in FIG. 2), the leads 56 extend through the housing 54' for electrically coupling the antenna 52 to the wiring 44. The leads 56 can be coupled to the wiring 44 using any suitable electrical fasteners (not shown). In one suitable embodiment, the electrical fasteners allow the leads to be releasably coupled to the wiring 44 to facilitate replacement of the antenna 52. Being able to easily change out the antenna 52 is advantageous in replacing a broken antenna with a new one or removing the existing antenna with one having a different operating frequency. In one suitable embodiment, the body 58 and/or closure 60 include a channel or passageway for receiving the leads 56 and thereby allowing the leads to extend through the housing 54'.

The material from which the housing 54, 54' is made is suitably selected to inhibit or minimize the effect the material has on the electromagnetic field being emitted from the antenna 52 and passing through the housing material. That is, the housing 54, 54' is made from a material that will not effect or will only minimally effect the area of influence 40 of the electromagnetic field from each of the repelling stations 30 and each of the attracting stations 40. In one suitable example, the area of influence 40 is reduced by less than 50% by the material of housing 54, 54'. In a particularly suitable embodiment, the area of influence 40 is reduced by less than 25% by the material of housing 54, 54'. Examples of suitable materials from which the housing 54, 54' may be made include (without limitation) polyethylene, propylene, isoprene, and butylenes (i.e., polyolefins).

Figure 5:
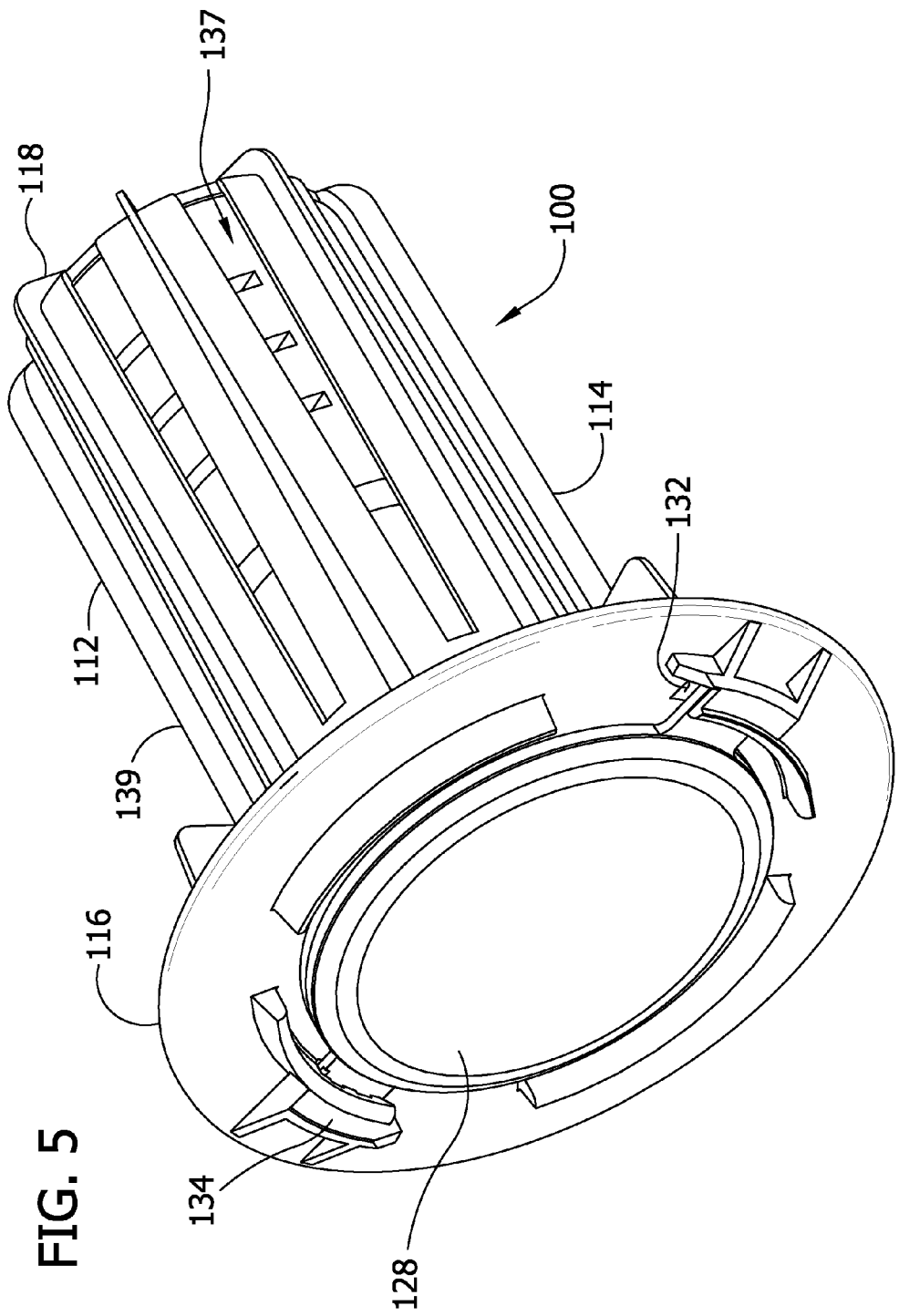
FIG. 5 is a perspective of one embodiment of an insect monitoring and control station.
Figure 6:
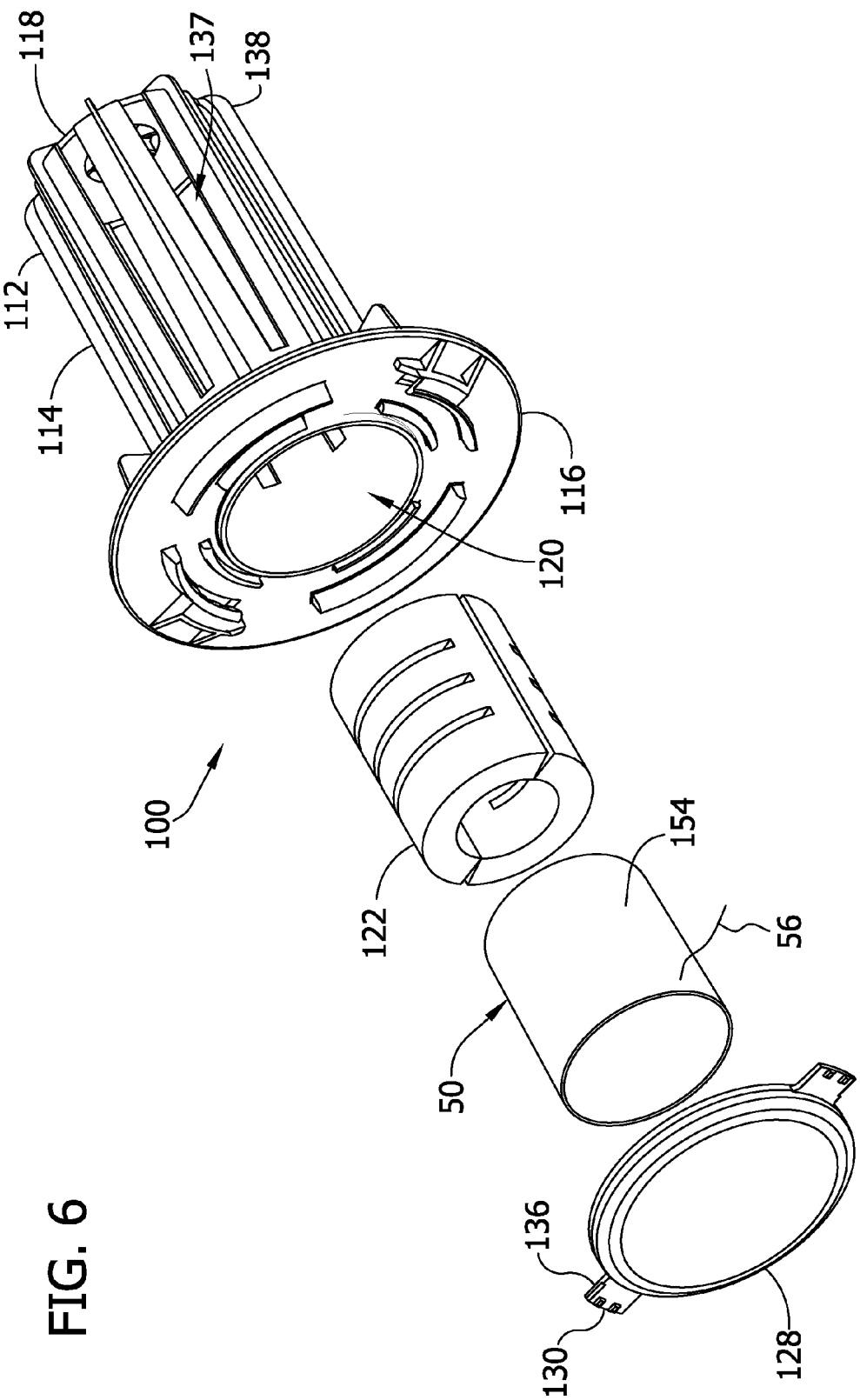
FIG. 6 is an exploded perspective of the insect monitoring and control station of FIG. 5.
Figure 9:
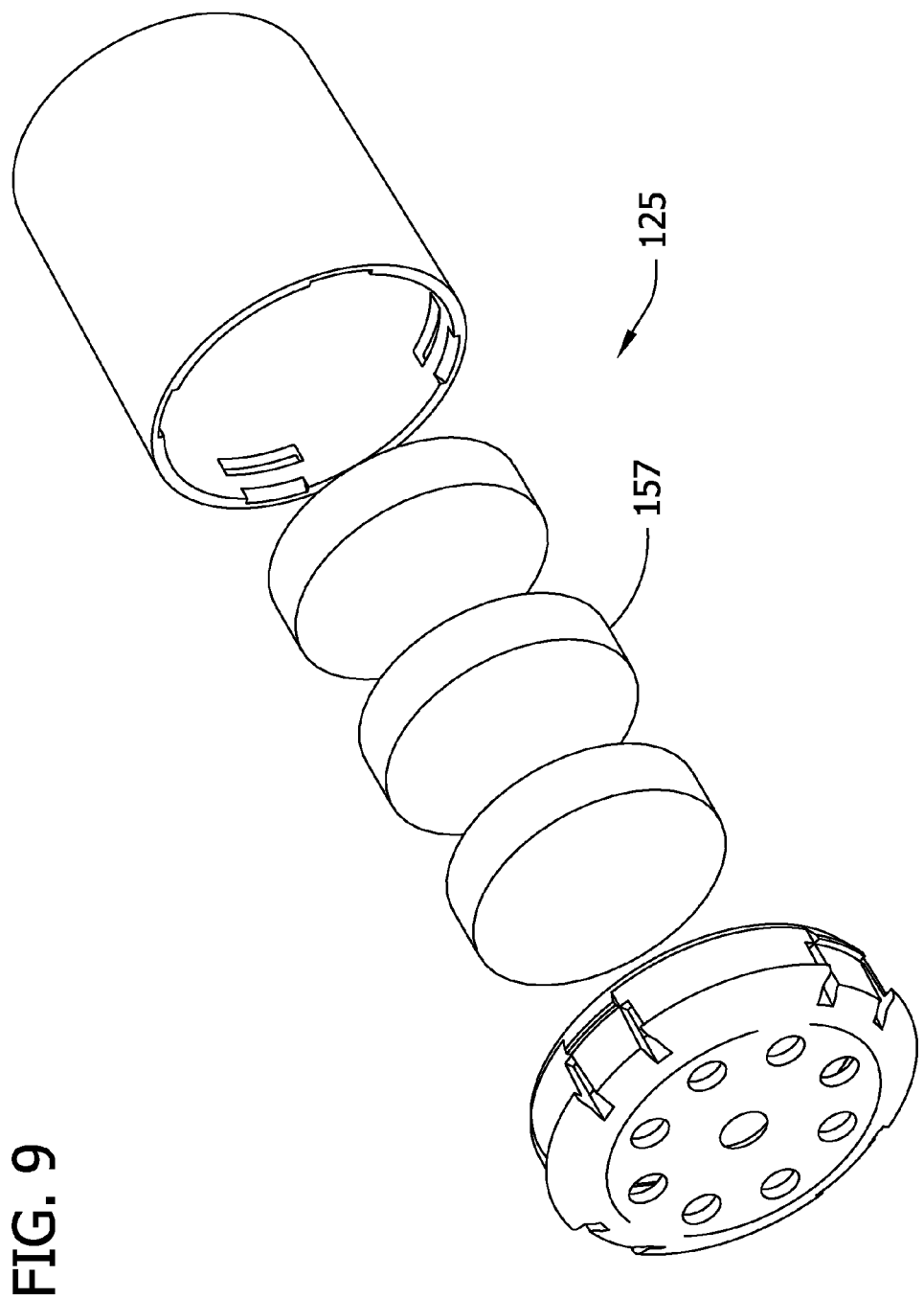
FIG. 9 is an exploded perspective of a bait container for use with the insect monitoring and control station of FIG. 5.

FIGS. 5 and 6 illustrate an insect monitoring and control station, generally illustrated by reference numeral 100, suitable for use as either the repelling stations 30 or the attracting stations 40 of FIG. 1. Although the illustrated station embodiment is particularly suitable for monitoring and controlling termites, it is contemplated that the station may be used to monitor and control other insects, such as ants. As best illustrated in the exploded view of FIG. 6, the station 100 includes a substantially hollow housing 112 having an annular side wall 114, a top surface 116 and a bottom surface 118 defining an interior volume 120. A portion of the top surface 116 of the housing 112 is open exposing the interior volume 120. The station 100 is adapted to receive one or more of the transmitting devices 50 in its interior volume 120 (one transmitting device being illustrated in FIG. 6). Other components of station 100 can be placed into the interior volume 120 of the station 100 along with the transmitting device 50 or instead of the transmitting device. These components include, for example, an aggregation base 122, a monitoring and/or bait container 125 (described below with reference to FIG. 9).

As seen in FIGS. 5 and 6, a cap 128 is removably received on the top surface 116 to close the housing 112. In one embodiment, the cap 128 has a pair of tabs 130 that extend into slots 132 in the top surface 116 of the housing 112 (FIG. 5). The cap 128 is then rotated either counter clockwise or clockwise to engage the cap 128. Each of the tabs 130 includes a chamfer 134 along a leading edge 136 of the tab. As the cap 128 rotates into position, the chamfer 134 helps guide the tabs 130 into position within the respective slots 132. Any suitable means for securing the cap 128 to the top surface 116 may be used.

The station 100 includes a plurality of openings 137 passing through the side wall 114 to permit the ingress and egress of termites into and out of the interior volume 120 of station. In one suitable embodiment, the side wall 114 has several vertical elongated openings 137 therein extending substantially the entire length of the side wall. As used herewith, vertical is used in reference to the preferred orientation of the station 100 with the top surface 116 facing in an upward direction. It is contemplated however, that other shapes and orientations for the openings may be used. For example, the openings may be horizontal elongated openings, or may be circular openings randomly placed or formed in a repeating pattern. Additionally, there may be openings 137 in the bottom surface 118 leading to the interior volume 120. In another configuration, the openings 137 can be formed only in a lower portion 138 of the side wall 114 of the housing 112 such that an upper portion 139 of the side wall 114 near the top surface 116 of the housing 112 is imperforate. In one suitable embodiment, the housing 112 is formed from a durable, corrosion resistant material, as for example, an acrylic or high strength plastic. Although shown as having a generally cylindrical shape, the housing 112 may be any other suitable shape, such as rectangular.

In use, the station 100 is at least partially received within a cavity accessible to termites, while still being accessible above ground by a user. The cavity may be a subterranean cavity, or may be a cavity within a wall or other framework of a building or other above ground structure. The cavity may be formed in the soil, or the cavity may be formed in a paving material, such as concrete or asphalt, with soil beneath the paving material. In one suitable embodiment, the station 100 is substantially entirely received within the cavity such that only the top surface 116 and cap 128 are accessible from above ground. However, in some situations, the station 100 may be nearly entirely on top of the ground, such that the cavity is very shallow.

In one embodiment, as shown in FIG. 6, the aggregation base 122 is received within the interior volume 120 of the housing 112 such that it is positioned adjacent the lower portion 138 of the side wall 114 so that the elongate openings 137 expose the aggregation base 122 to the subterranean cavity. The transmitting device 50 is then received within the interior volume 120 of the housing so as to be received adjacent to the aggregation base 122.

Figure 7:
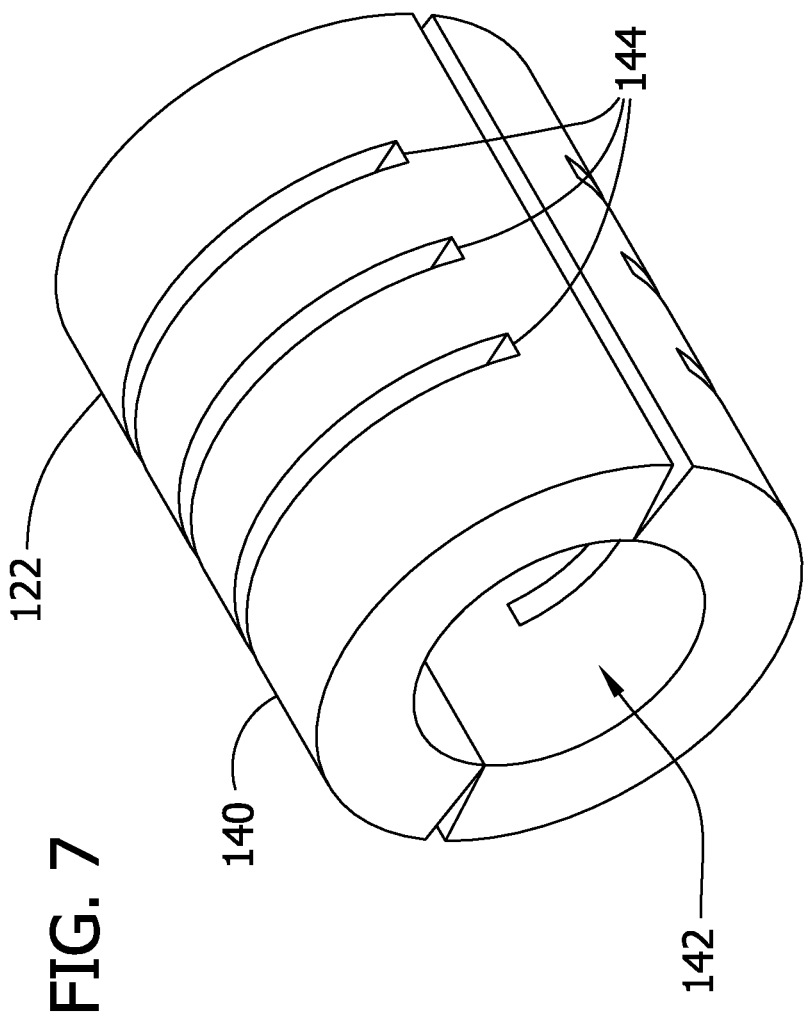
FIG. 7 is a perspective of an aggregation base used with the insect monitoring and control station of FIG. 5.

FIG. 7 illustrates one suitable embodiment of the aggregation base 122. In the illustrated embodiment, the aggregation base 122 is formed in a generally cylindrical shape such that an outer surface 140 of the aggregation base faces the interior of the sidewall 114 of the station 100 or cavity when placed in service. Other versions of the aggregation base may have different geometric shapes suitable for use depending on the cavity into which the base is received. The illustrated aggregation base 122 has a void 142 substantially centrally located within the aggregation base 122 which is suitable for an aggregation site for termites. The aggregation base 122 includes channels 144 passing through the aggregation base 122 from the outer surface 140 inward to the void 142. During use, the channels 144 guide the termites from the outer surface 140 to the aggregation site in the void 142 of the aggregation base 122. In one suitable configuration, the aggregation base 122 is made from a cellulosic material attractive to termites, such as wood.

Figure 8:
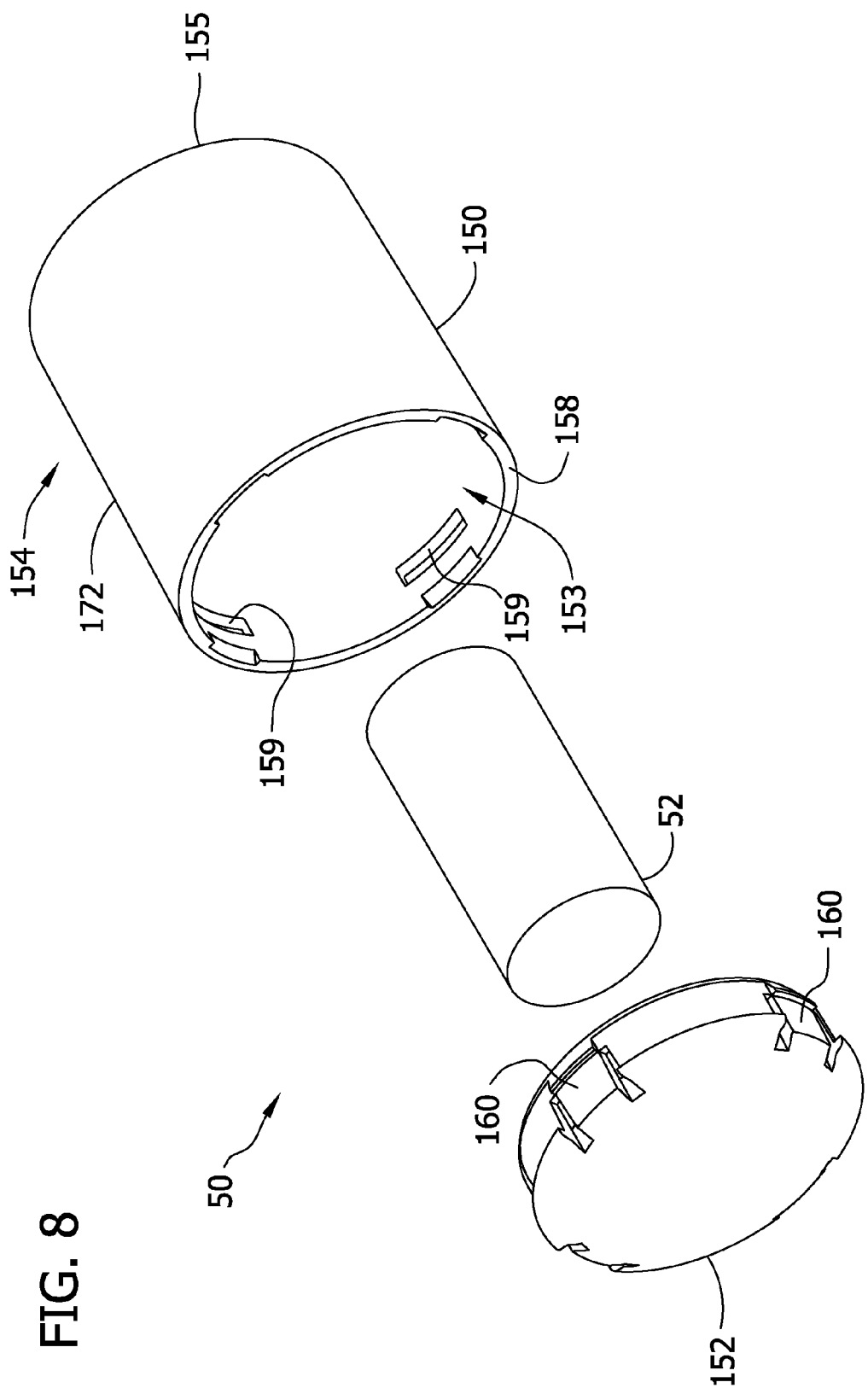
FIG. 8 is an exploded perspective of a transmitting device for use with the insect monitoring and control station of FIG. 5.

Referring now to FIGS. 6 and 8, the transmitting device 50 comprises a housing 154 and an antenna 52 received in the housing. The housing 154 includes a cup 150 and an accompanying lid 152. As illustrated, the cup 150 has a bottom surface 155 that is opposite the lid 152 so that the housing 154 is configured as a closed cylinder defining an interior chamber 153 to complement the configuration of the housing. The bottom surface 155 is described as the surface adjacent the aggregation base 122 when the transmitting device 50 is placed in the station 100 in an operational fashion, and for convenience, the lid 152 comprises the opposite surface. However, it is contemplated that the transmitting device 50 may also be inserted into the station 100 without the aggregation base 122 or with the aggregation base on top of the transmitting device. An outer width of the cup 150 is slightly less than an inner width of the housing 112 so that the cup may be removably received within the housing.

As seen in FIG. 8, the antenna 52 of the transmitting device 50 is received within the interior chamber 153 of the cup 150 of the housing 154. The lid 152 is removably secured to the cup 150 using any suitable means. Referring to FIG. 8, in the illustrated embodiment, the cup 150 has several recesses 159 near a top rim 158 thereof. The lid 152 includes corresponding flanges 160 adapted to be received in the recesses 159 to secure the lid 152 to the cup 150. It is also contemplated that in one suitable embodiment a suitable power supply and the transmitter 54 can be placed within the interior volume 120 of the station 100. In one particularly suitable embodiment, the power supply, transmitter 54, and transmitting device 50 are held in assembly and sealingly enclosed within the housing 154.

In operation, a cavity of appropriate dimensions can be made in the soil at a desired location for positioning of the station 100 therein. In one embodiment, the aggregation base 122 and transmitting device 50 are placed inside the station housing 112, and the station 100 is inserted or pressed into the cavity until the top surface 116 of the station housing 112 is near the soil surface. In another embodiment, the transmitting device 50 is placed into the cavity and buried independently of the station 100. One or more stations 100 having aggregation bases 122 therein may be inserted into respective separate cavities located in relatively close proximate to the transmitting device 50.

The leads 56 of the transmitting device 50 are electrically fastened to the wiring 44 of the insect control system 10 using suitable electric fasteners. The transmitter 42 of the insect control system 10 is activated to send a signal via the wiring 44 to the station 100. If the station 100 is configured to repeal termites (i.e., operate as a repelling station 20 of FIG. 1), termites will not approach the station or the area of influence 46 around the station. In addition, any termites within the area of influence 46 will be driven away.

If the station is configured to attract termites (i.e., operate as an attracting station 40 of FIG. 1), termites will be drawn to the station 100 and the area of influence 46 around the station. As termites are drawn to the station 100 by the electromagnetic field being emitted by the antenna 52 of the transmitting device 50, they will enter the interior volume 120 of the housing 112 through the openings 137 and find the aggregation base 122, which is a potential food source. If the termites enter through the openings 137 and contact the housing 154 of the transmitting device 50 above the aggregation base 122, the imperforate sidewalls of the housing direct the termites down along the elongate openings 137 to the aggregation base 122. The channels 144 encourage the termites to enter the aggregation base 122 and begin to use the internal void 142 created by the base as an aggregation site. The void 142 creates a stopping area in the center for aggregation.

The station 100 can be inspected periodically for evidence of termite infestation by visually examining the interior volume 120 of the housing 112 including the aggregation base 122 for signs of infestation. Inspection of the station 100 can be performed weekly, bi-weekly, monthly, etc. as needed or desired. Because of the nature of termite attack against a cellulosic material, such as the aggregation base 122, visible signs or evidence of such attack will invariably be left on the monitors. This evidence can include, for example, exploratory tunnels built by termites as they consume the material in such a way that telltale signs of termite infestation are left on the surface of the material and/or mud tubing constructed over and across the interior surface of the station housing 112. Such signs of infestation would be obvious to anyone skilled in the art of termite damage detection. It is also contemplated that a monitoring container (not shown) can be placed into the interior volume 120 of the housing 112 along with the transmitting device 50 and aggregation base 122. It is also contemplated that the monitoring container can be placed into the interior volume 120 of the housing 112 instead of the aggregation base 122.

Figure 24:
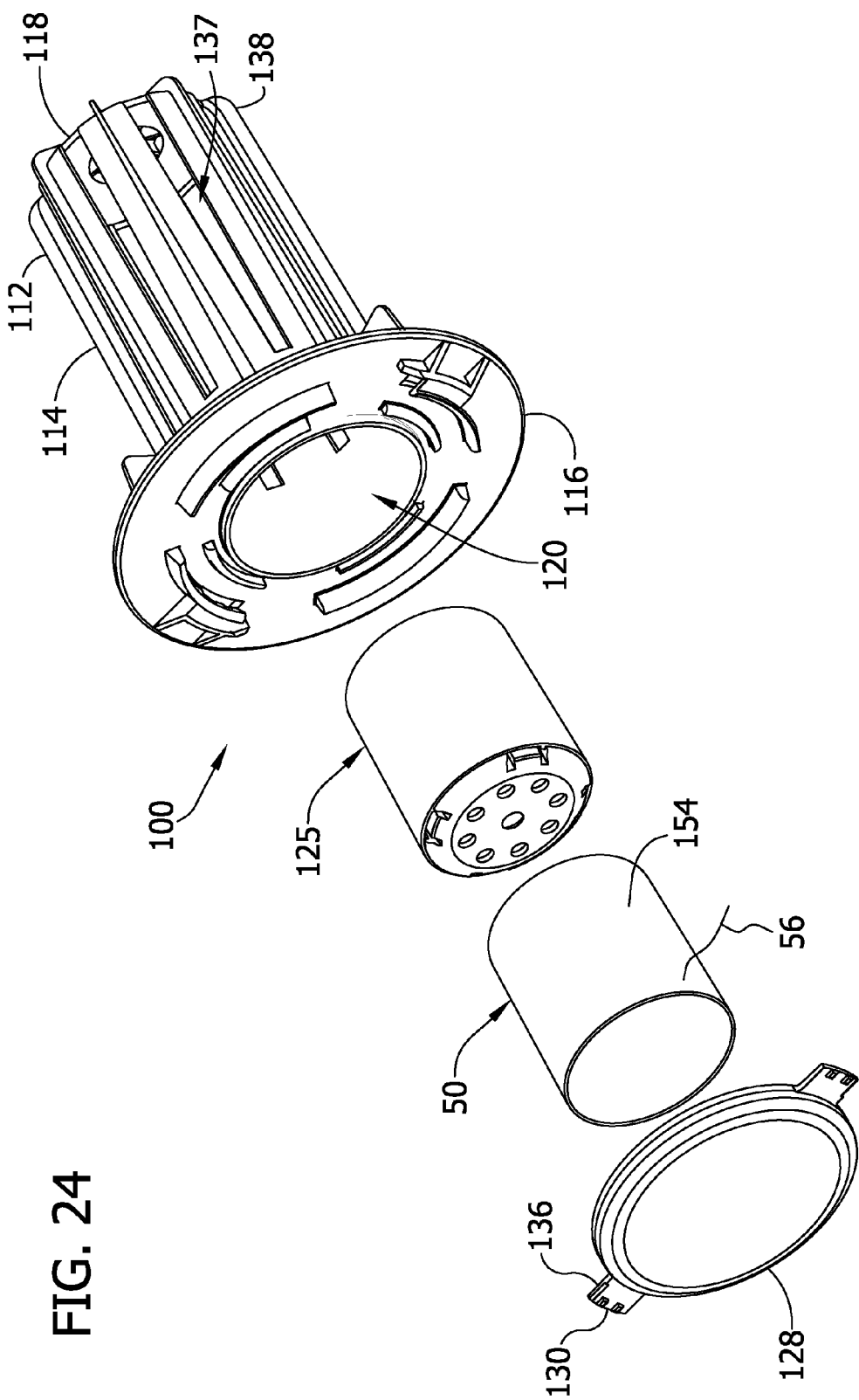
FIG. 24 is an exploded perspective of another embodiment of the insect monitoring and control station of FIG. 5.

If termite attack is discovered, the station 100 can be baited using a bait container 125 (see FIG. 9) having a suitable toxicant containing bait 157 therein. The toxicant-containing bait 157 may be in the form of purified cellulose toxicant delivery tablets. One suitable termite bait composition is described in co-assigned U.S. Pat. No. 6,416,752 entitled "TERMITE BAIT COMPOSITION AND METHOD", the disclosure of which is incorporated herein in its entirety by reference. The bait container 125 can be placed into the interior volume 120 of the housing 112 along with the transmitting device 50 and aggregation base 122 or by replacing the transmitting device 50 or aggregation base 122 with the bait container 125 (see FIG. 24). If no termite attack is discovered, the cap 128 is replaced and the station 100 is inspected again after the appropriate interval.

Figure 10:
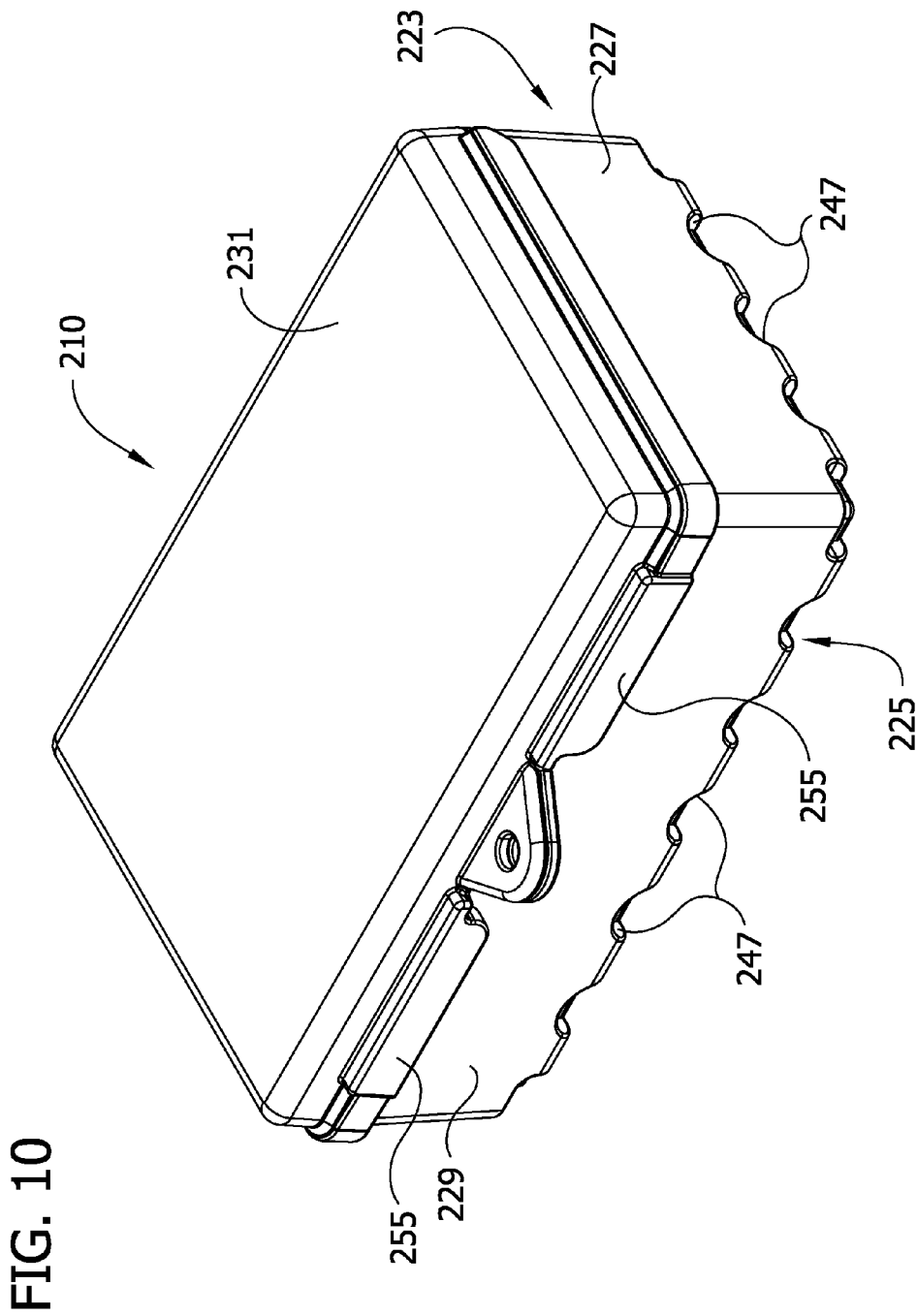
FIG. 10 is a perspective of another embodiment of an insect monitoring and control station with a lid of a container being in a closed position.

FIG. 10 illustrates another insect monitoring and control station, generally illustrated by reference numeral 210, suitable for use as either the repelling stations 30 or the attracting stations 40 of FIG. 1. Although the illustrated station 210 embodiment is particularly suitable for monitoring and controlling termites, it is contemplated that the station may be used to monitor and control other insects, such as ants. This station 210 is in the form of an above-ground termite station in that it is intended to be used on or above soil, such as by being secured on a suitable above-ground mounting surface including, without limitation, on top of soil, on a generally horizontal surface, a sloped surface or a vertical mounting surface (such as an interior or exterior wall of a house or building, a tree, a fence post or picket, and the like).

The station 210 generally comprises a rectangular box-shaped container, indicated generally at 223, having a base panel 225 (or bottom panel in the orientation illustrated in FIG. 10, broadly referred to herein as a base of the container), longitudinally opposite end panels 227, laterally opposite side panels 229 and a lid 231 together defining an interior space 233 (FIG. 11) of the container. The end panels 227 and side panels 229 of the illustrated embodiment together broadly define what is referred to herein as a side of the container 223. Accordingly, it is understood that the container 223 may be other than rectangular box-shaped, such as cylindrical (which would have a generally annular side) or another suitable shape, as long as the base panel 225, the side and the lid 231 are configured and arranged to together define the interior space 233 of the container.

The base panel 225 suitably has an outer surface 235 (FIG. 13) that faces a mounting surface upon which the termite station is mounted, and an inner surface 237 (FIG. 12) that faces inward of the container and in part defines the interior space 233 of the container. The illustrated base panel 225 is rectangular and is suitably generally flat, or planar, so that substantially the entire outer surface 235 of the base panel is in opposed and abutting relationship with the mounting surface upon mounting of the termite station 210. The illustrated end panels 227 and side panels 229 are also flat, or planar and are oriented generally perpendicular to the base panel 225.

In one suitable embodiment, the container 223 may be constructed of a durable material that is not preferentially fed upon by termites, such as, for example, an acrylic or high strength plastic. In another suitable embodiment the container 223 may be constructed of a biodegradable material that is not preferentially fed upon by termites, such as, for example, biopolymers derived from organic materials. In a particularly suitable embodiment the container 223 is substantially opaque, although it is understood that the container may instead be generally translucent or even transparent.

Figure 12:
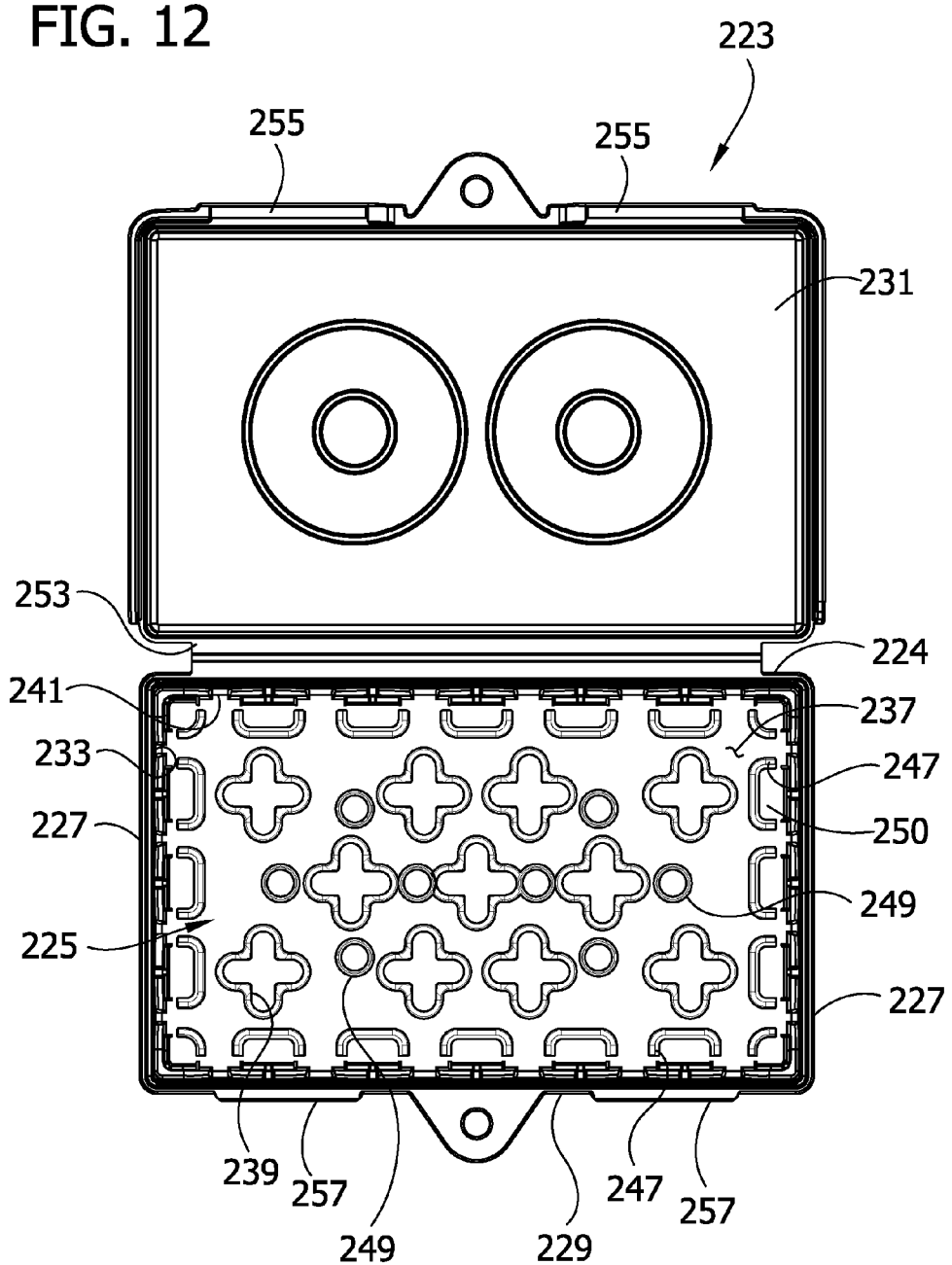
FIG. 12 is a top plan of the container of the insect monitoring and control station with the lid of the container being in its opened position and the cartridge being removed from the container.
Figure 15:
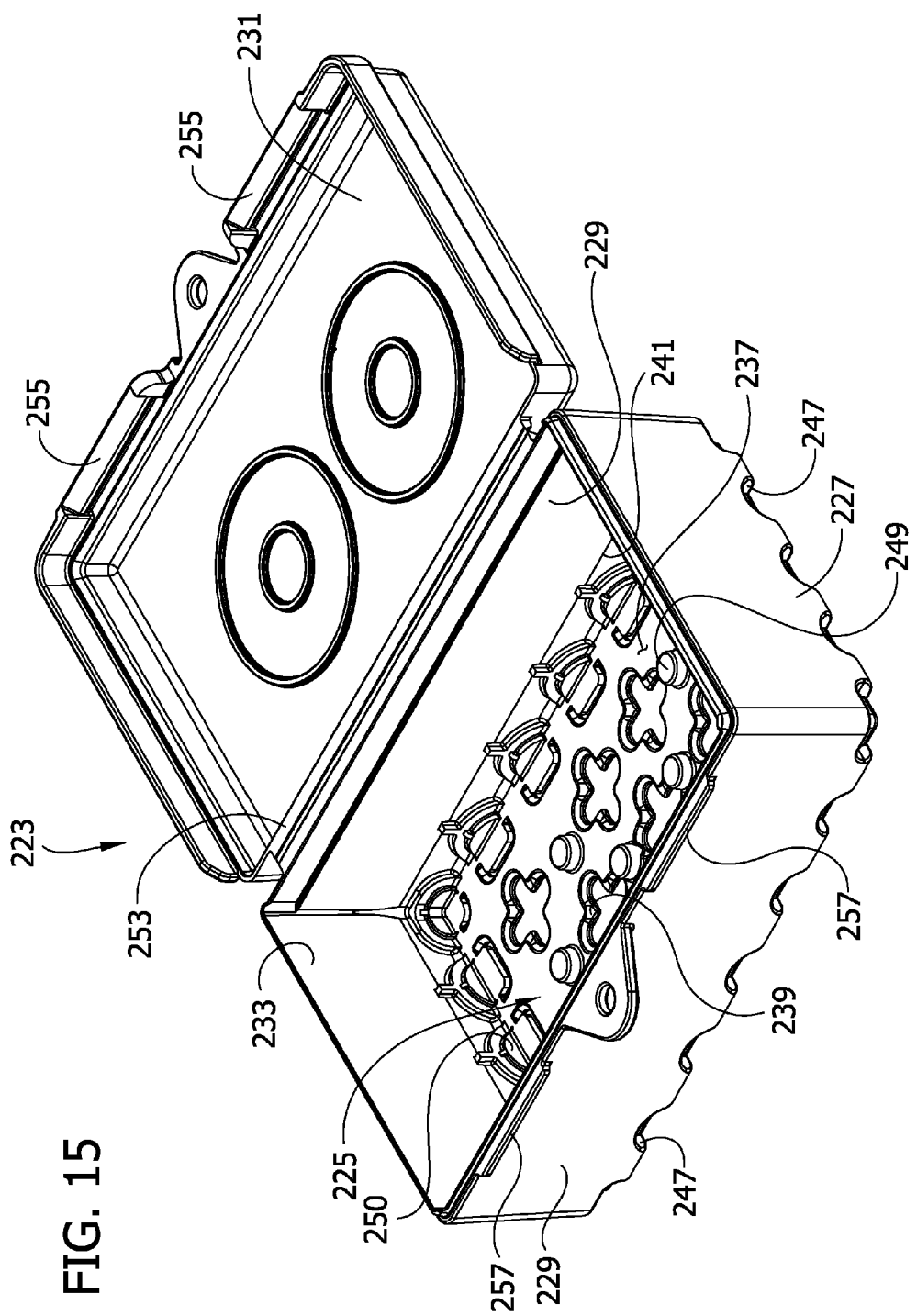
FIG. 15 is a top perspective of the container of the insect monitoring and control station with the lid in its opened position.
Figure 16:
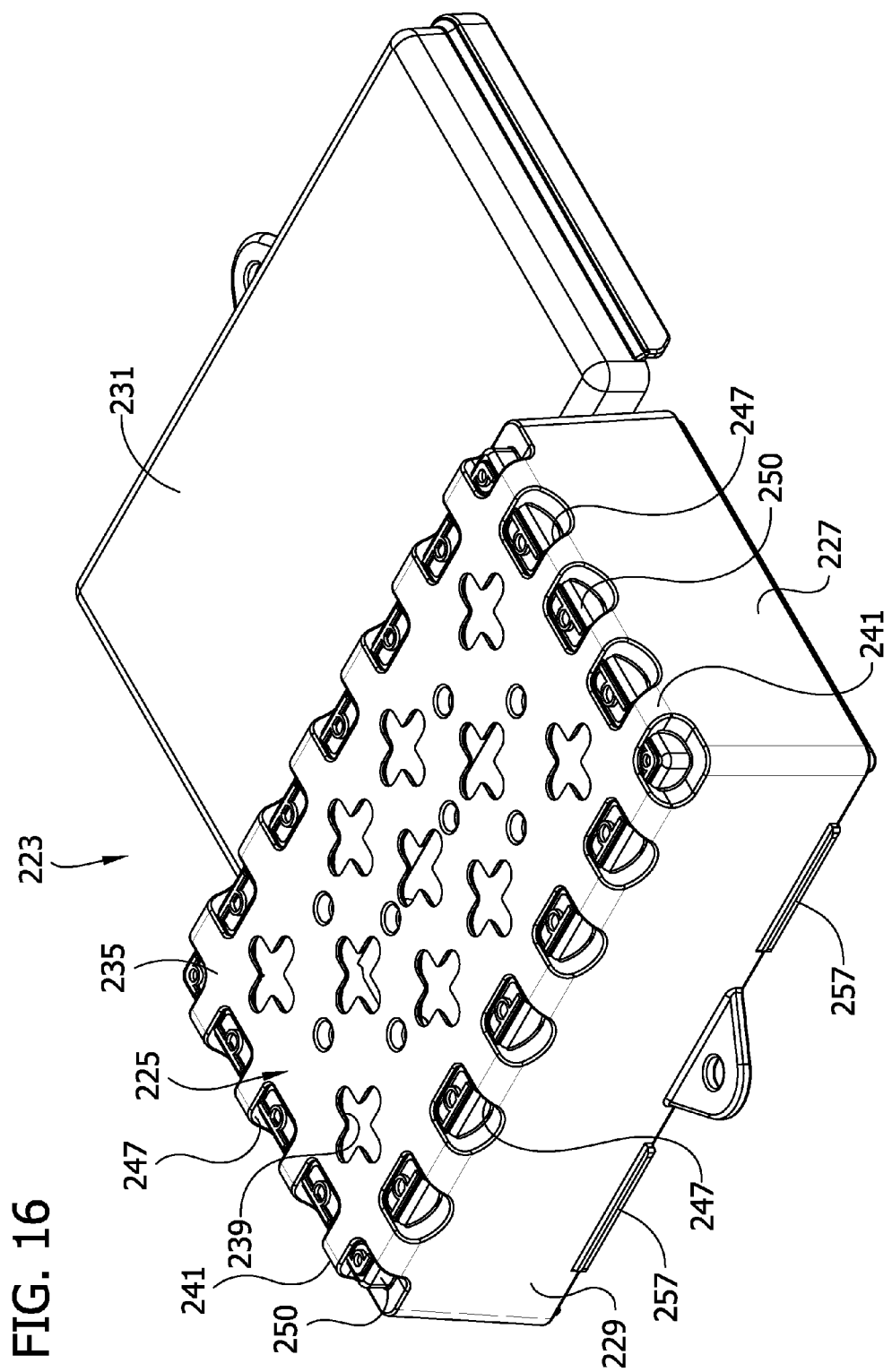
FIG. 16 is a bottom perspective of the container of the insect monitoring and control station with the lid in its opened position.

With particular reference to FIGS. 12, 15 and 16, the base panel 225 is suitably configured to permit mounting of the base panel itself (and hence the termite station container 223), to the desired mounting surface. For example, in the illustrated embodiment at least one and more suitably a plurality of openings 239 are formed in the base panel 225 in spaced relationship with, i.e., inward of, a peripheral edge 241 (FIG. 12) of the base panel (the "peripheral edge" of the base panel being defined as the intersection of the base panel with the side, e.g., the end panels 227 and the side panels 229).

As seen best in FIG. 16, the illustrated openings 239 each having a generally plus-sign or cross shape (i.e., comprised of intersecting elongate slots). However, it is contemplated that these openings 239 may be of any shape without departing from the scope of this invention. It is also contemplated that the openings 239 need not all be of the same shape. Eleven such openings 239 are formed in the base panel 225 of the illustrated embodiment, with one of the openings being centrally located (both longitudinally and laterally) in the base panel. While the spacing between all eleven openings 239 is non-uniform, it is understood that the spacing between the openings may instead be uniform. It is also understood that more or less than eleven openings 239 may be formed in the base panel 225, including a single opening. Additionally, where multiple openings 239 are present in the base panel 225, as in the illustrated embodiment, the pattern or arrangement of the openings may be other than that illustrated in FIG. 16.

These base panel openings 239 are used to mount the base panel 225 (and hence the container 223) on the mounting surface using suitable fasteners (e.g., screw fasteners) that extend in part through the openings and into the mounting surface. As illustrated in FIG. 16, each of the openings 239 is suitably sized in planar dimension (e.g., length and width, or diameter where the opening is circular) so that the fastener may extend through the opening along a relatively large fastener location range. The term "fastener location range" is intended herein to mean the length of open space along which the fastener may be located in a particular direction within the opening 239.

Providing a plurality of such openings 239 in the base panel 225 allows the base panel (and hence the termite station 221) to be arranged at a desired location on the mounting surface, such as with one or more of the openings located over an opening (not shown) formed by termites in the mounting surface, while providing sufficient additional openings through which fasteners may extend through the base panel into the mounting surface at a more stable (e.g., less damaged) or stronger segment of the mounting surface. Thus, in such an embodiment the number of openings 239 exceeds the number of fasteners used to fasten the base panel on the mounting surface by at least one.

The openings 239 also allow the termite station 210 to be secured to the mounting surface by passing the fasteners through a single structural member of the container 223, i.e., the base panel 225, as opposed to multiple components thereof. As a result, the lid 231 of the container 223 is free of openings that may otherwise be used as in the case with conventional designs because it is unnecessary for mounting fasteners to extend through the lid. This arrangement makes it easier to visually place the termite station 21,0 and in particular the base panel 225, in the desired location on the mounting surface and also allows opening and closing of the lid 231 while the termite station remains mounted on the mounting surface, and in particular without having to loosen or remove the mounting fasteners.

The openings 239 in the base panel 225 also provide multiple entry points for the ingress and egress of termites to and from the interior space 233 of the container 231 through the base panel 225. To this end, the base panel is openings 239 are generally chamfered, or tapered outward (e.g., expanding in planar dimension) from the base panel outer surface 235 to the inner surface 237 thereof as illustrated in FIG. 15 so that the tapered portions act as entry ramps into the interior space 233 of the container 223, thereby reducing or minimizing discontinuities encountered by termites entering the container. As an example, in one embodiment the tapered openings 239 define a ramp angle from the outer surface 235 to the inner surface 237 of the base panel 225 in the range of about 15 to about 60 degrees, and more suitably of about 45 degrees.

Peripheral (i.e., side entry) openings 247 are formed in the end panels 227 and side panels 229 (i.e., broadly, the side) of the illustrated container 223 in spaced relationship with each other about the periphery of the container. More suitably, these peripheral openings 247 extend from the respective end panels 227 and side panels 229 to the base panel 225 (i.e., to the corners where the end panels and side panels meet the base panel), to allow termites to enter the interior space 233 of the container 223 from the sides thereof, such as along a termite tunnel formed along the mounting surface, instead of from behind the base panel (i.e., other than through the openings 239 formed in the base panel).

In a particularly suitable embodiment, the peripheral openings 247 formed in the end panels 227 and side panels 229 continue into the base panel 225 so that termites that pass through the peripheral openings are disposed further within the interior space 233 of the container 223 before coming into contact with the container (i.e., with the base panel). However, it is not necessary that the peripheral openings 247 extend into the base panel 225 to remain within the scope of this invention. It is also contemplated that the base panel 225 may be chamfered or tapered where the peripheral openings 247 contact the base panel, such as in a manner similar to the tapered openings 239 formed in the base panel.

As best seen in FIG. 16, the peripheral openings 247 formed in one end panel 227 are aligned with corresponding peripheral openings in the opposite end panel and peripheral openings in one side panel 229 are aligned with corresponding peripheral openings in the opposite side panel. The peripheral openings 247 formed in the side (e.g., the end and side panels 227, 229) of the container 223 allow the termite station 210 to be mounted on a mounting surface along a termite tunnel, such as by breaking the tunnel and placing the base panel 225 against the mounting surface within the broken away portions of the tunnel aligned with one or more of the peripheral openings. It is understood that the number of peripheral openings 247 provided in the container 223 may be more or less than that of the illustrated container 223, including only a single peripheral opening.

In the illustrated embodiment, the peripheral openings 247 are at least partially closed by respective access closures 250 that can be removed from the container to provide access through the peripheral opening. This allows the container to be generally sealed about its periphery except at those peripheral openings 247 that are aligned with the termite tunnel. The access closures 250 are removeably connected, and more suitably frangibly or rupturably connected to the container 223 at the peripheral openings 247 so that the closures may be removed (such as manually or by using a suitable punch tool, pliers, screw drive or other suitable tool) from the container to provide access to the interior space of the container. In a particularly suitable embodiment, the access closure 250 is formed integrally with (e.g., molded as part of) the container 223. It is contemplated, however, that the access closures 250 may be formed separate from and removeably connected to the container at the peripheral openings 247, such as thermal welding, adhesive or other suitable connecting technique without departing from the scope of this invention. It is also understood that in some embodiments the access closures 250 may be refastenably connected to the container 223 (such as, for example, by adhesive, hook and loop fasteners or other suitable mechanical fasteners) so that the termite station 210 can be reconfigured and reused in treating a different termite tunnel or other infestation within the scope of this invention. In another suitable embodiment (not shown), the access closures 250 are omitted from the container 223.

Figure 13:
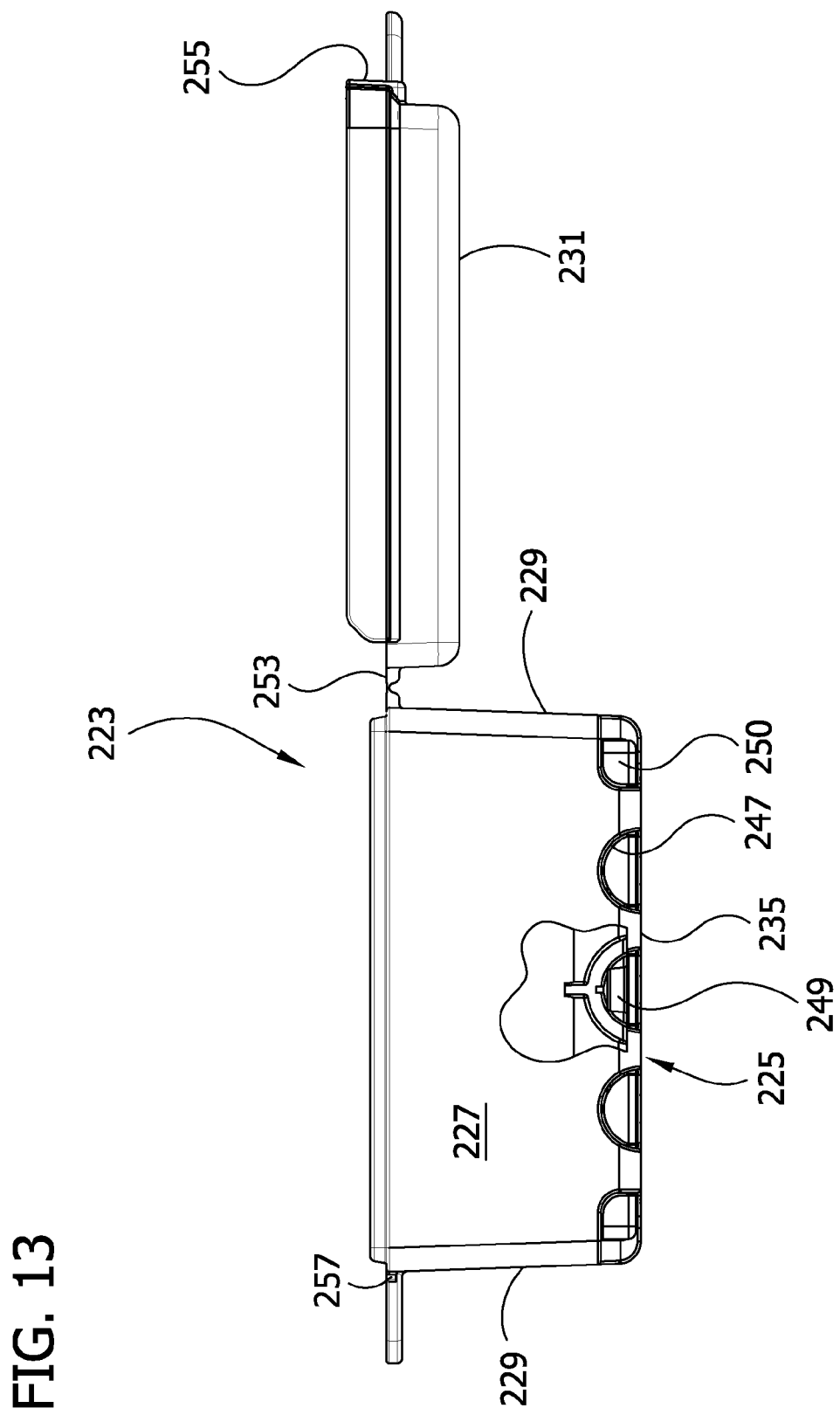
FIG. 13 is a side elevation of the insect monitoring and control station with the lid of the container in its opened position and an access tab removed from the container.
Figure 14:
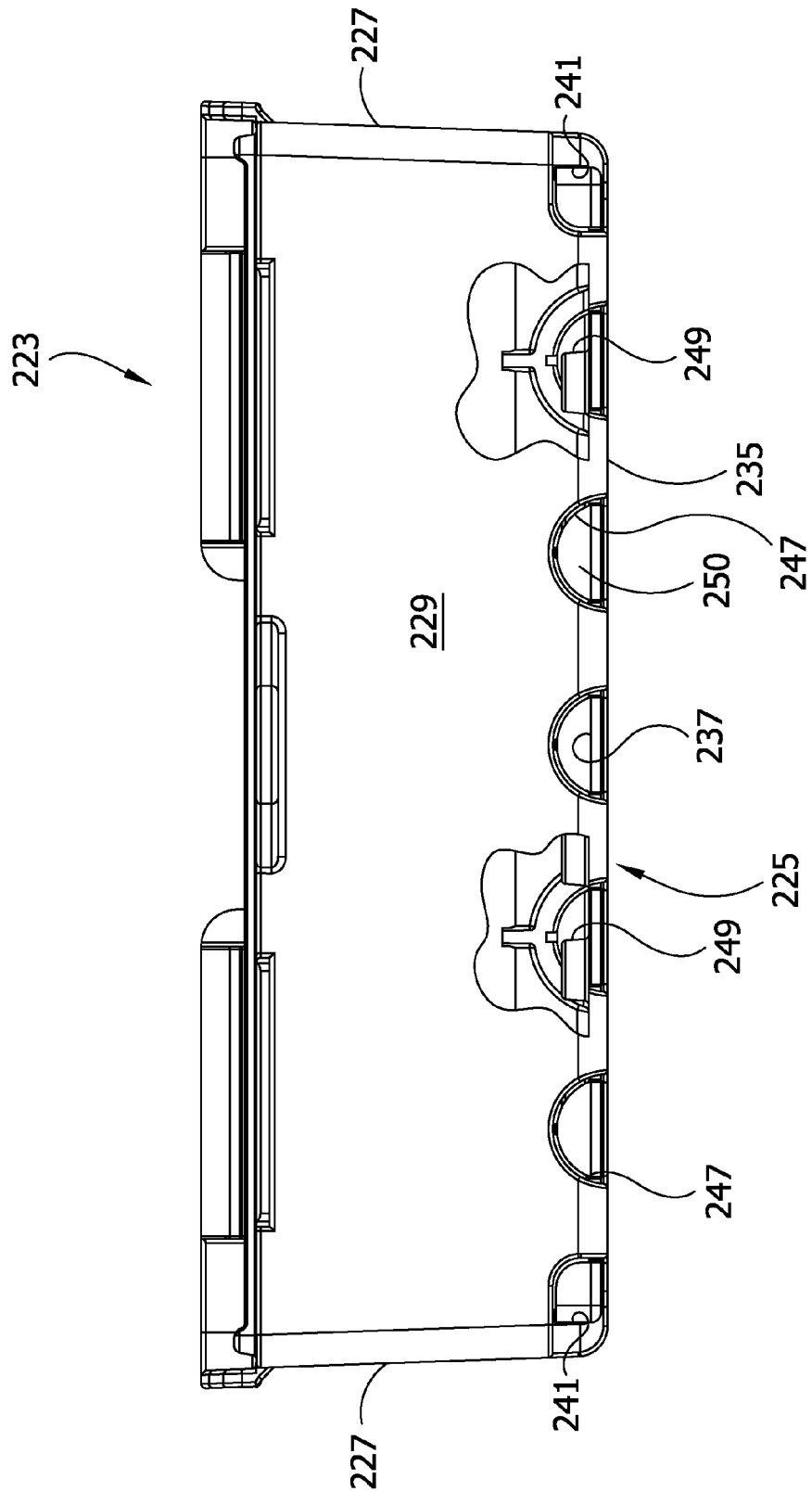
FIG. 14 is a front elevation of the insect monitoring and control station with another access tab removed from the container.

One or more raised spacing elements 249 (e.g., nubs as illustrated in FIGS. 12-14, ribs, bumps, or other suitable locating elements) are provided on the inner surface 237 of the base panel 225 so as to extend out from the plane of the base panel into the interior space 233 of the container 223. In particular, the spacing elements 249 are formed (e.g., molded in the illustrated embodiment) integrally with the base panel 225 of the container 223. However, these spacing elements 249 may alternatively be formed separate from the base panel 225 and secured to the inner surface 237 thereof, such as by adhesive, welding or other suitable securement technique without departing from the scope of this invention. It is contemplated that these spacing elements 249 may be omitted.

Figure 11:
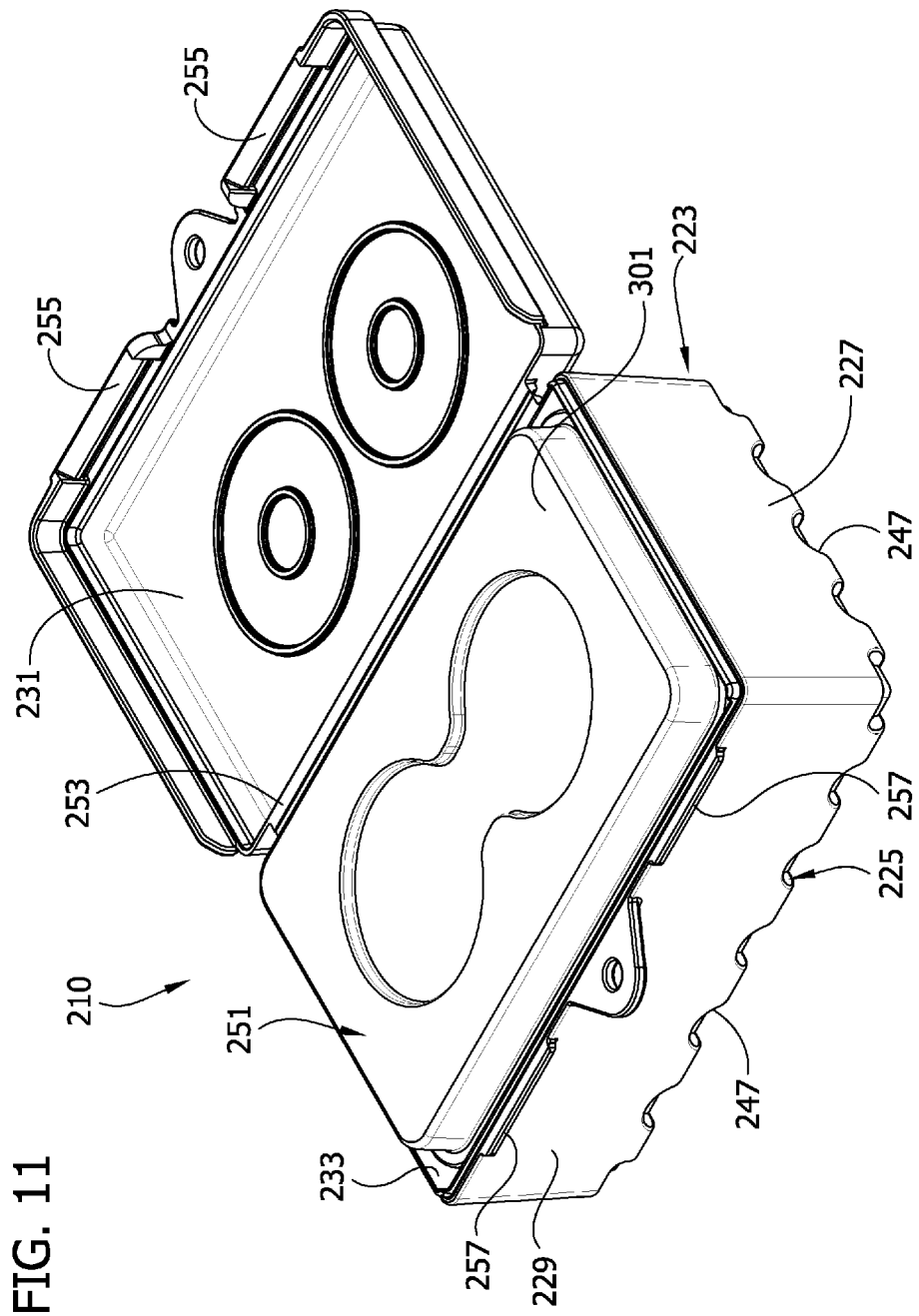
FIG. 11 is a perspective similar to FIG. 10 with the lid of the container being in an opened position to expose a cartridge of the insect monitoring and control station disposed therein.

Referring back to FIG. 10, the lid 231 (broadly, a closure for the container 223) is suitably positionable between a closed position (FIG. 10) and an open position (FIG. 11) in which the interior space 233 of the container 223 is accessible. More particularly, the illustrated lid 231 is hinged to the peripheral side wall of the container (e.g., to one of the container side panels 229 as in the illustrated embodiment, or to one of the end panels 227) for hinged motion relative thereto, and more suitable relative to the base panel 225, between the closed and open positions of the lid. For example, as seen in FIG. 13, the lid 231 may be hinged to the side panel 229 in the manner of a "living hinge"—in which the lid is formed (e.g., molded) integrally with the side panel along a thinned or scored connecting web 253 that is sufficiently flexible to allow hinged motion of the lid relative to the side panel. It is understood, though, that the lid 231 may be formed separate from the end panels 227 and side panels 229 and mechanically hinged thereto by a suitable hinge mechanism (not shown) without departing from the scope of this invention. Referring to FIG. 11, a conventional latch and catch arrangement is provided (e.g., with one or more latch members 255 being provided on the lid 231 as in the illustrated embodiment and a corresponding catch or catches 257 being provided on the side panel 229 and/or end panel 227 of the container 223, or vice versa) for releasably securing the lid in its closed position.

Figure 18:
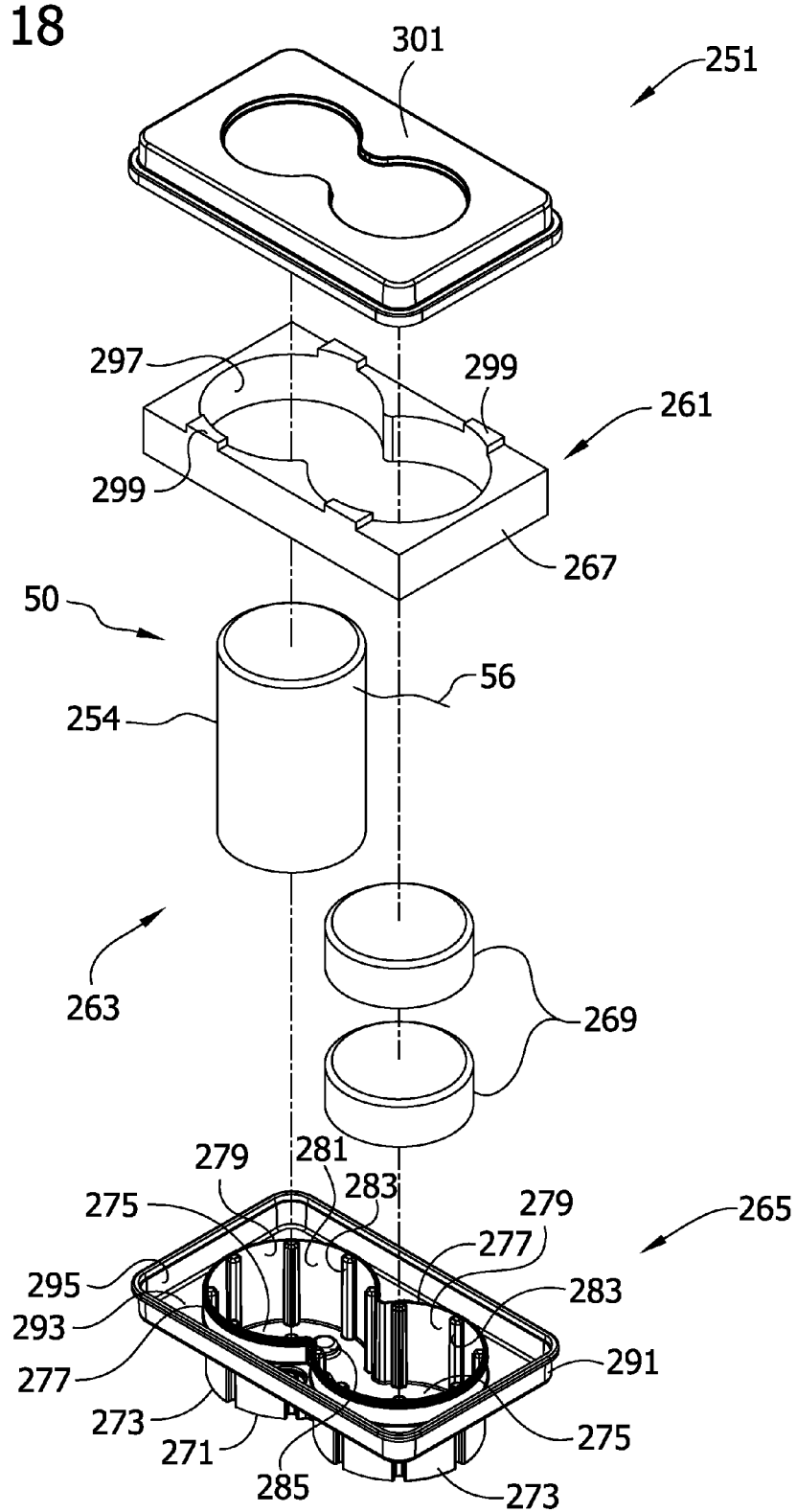
FIG. 18 is an exploded perspective of the cartridge of FIG. 17.

A cartridge, indicated generally at 251, is suitably sized and configured for disposition at least in part within the container 223 and more suitably entirely within the interior space 233 of the container in the closed position of the container lid 231. With particular reference to FIG. 18, the cartridge 251 comprises one or more internal components, and in the illustrated embodiment all of the internal components, of the termite station 221. For example, in the illustrated embodiment the cartridge 251 comprises an aggregation member (indicated generally at 261), at least one transmitting device (indicated generally at 50), at least one bait matrix (indicated generally at 263), and a holder (indicated generally at 265) for holding the transmitting device, the aggregation member, and bait matrix in assembly for insertion in and/or removal from the container 223 as a single unit.

The aggregation member 261 in one embodiment comprises an attractant, and, in one particularly suitable embodiment comprises a solid wood block 267 that has been heat treated at an elevated temperature, such as at least about 150 degrees C. (302 degrees F.) and more suitably between about 150 degrees C. and 215 degrees C. (420 degrees F.). It is understood, though, that the heat-treated wood from which the aggregation member 261 is made may alternatively be in a mulch form, a powder form or other suitable form. The aggregation member 261 is also suitably free from toxicant. For example, the above-described heat-treated wood has no added or natural toxicants.

In other embodiments, it is contemplated that the aggregation member 261 may instead comprise a non-toxic physical attractant, i.e., an attractant that once contacted by a termite promotes further foraging by termites. Suitable examples of such physical attractants include, without limitation, paper, cardboard, wood (e.g., other than wood that has been heat-treated in as described above) and other cellulose materials. Additionally an agar matrix alone or combined with sugars (i.e., xylose, mannose, galactose) and/or purified cellulose materials may be used as the aggregation member 261 to attract termites due to its moisture content and/or feeding attractant.

The bait matrix 263 suitably comprises a non-toxic attractant and may or may not carry a toxicant for eliminating or suppressing termite infestations. As one example, the illustrated bait matrix 261 comprises a purified cellulose powder compressed into one or more tablets 269. Without toxicant added to the bait matrix 261, the bait matrix may be suitably used to monitor for the presence of termites in the area of the termite station 221. Toxicant, if added to the bait matrix 261, is suitably one or more of a delayed-action type toxicant, or an insect growth regulator, pathogen or metabolic inhibitor. One such toxic bait matrix 261 is disclosed in U.S. Pat. No. 6,416,752 entitled TERMITE BAIT COMPOSITION AND METHOD", the entire disclosure of which is incorporated herein by reference. It is understood that other suitable known monitoring and/or toxic bait matrix materials and/or compositions may used without departing from the scope of this invention. In the illustrated embodiment, two such toxic bait matrix tablets 269 are used in the cartridge 251. However, it is contemplated that any number of bait matrices, including a single bait matrix, may be used without departing from the scope of this invention. It is also contemplated that the toxic bait matrix tables 269 can be omitted from the station 210.

The illustrated cartridge holder 265 comprises a cup portion 271 configured generally as a pair of cylindrical cups 273 (e.g., each having a closed end 275, an open end 277 and a side wall 279 extending therebetween) with overlapped segments so that the cup portion defines a pocket 281. The pocket 281 is suitably sized and configured for at least receiving, and more suitably for receiving and retaining, the transmitting device 50 and one or more of the illustrated circular bait tablets 269 therein. For example, the pocket 281 of FIG. 18 is suitably capable of receiving and retaining therein the transmitting device 50 in one of the generally cylindrical cups 273 that defines the pocket, and a stacked pair of the bait tablets 269 in the other cup. It is understood, however, that the pocket 281 may be shaped other than as illustrated herein and that the tablets 269 or other bait matrix disposed in the pocket may be shaped other than circular without departing from the scope of the invention. Additionally, it is contemplated that the cartridge holder 265 may comprise two or more separate pockets instead of the single pocket 281 illustrated in FIG. 18.

Figure 20:
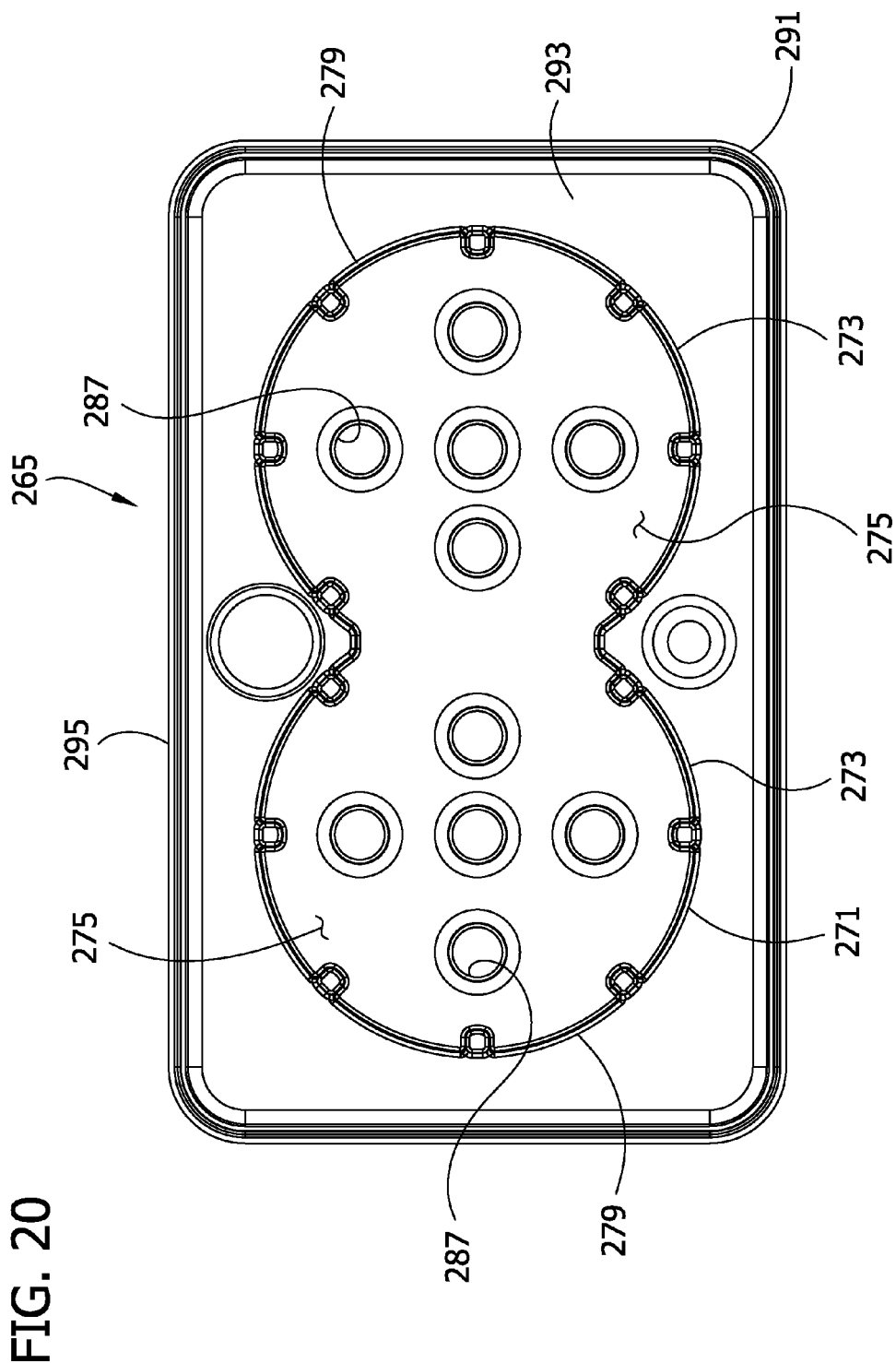
FIG. 20 is a top plan of a holder of the cartridge.

A plurality of projections, such as in the form of ribs 283 in the illustrated embodiment, are disposed lengthwise along the inner surface of each cup side wall 279 to extend laterally inward of the pocket 281 formed by the generally cylindrical cups 273. For example, the ribs 283 extend lengthwise from the closed end 275 of the cup 273 to the open end 277 thereof and project sufficiently inward from the inner surface of the cup side wall 279 to provide an interference, or friction fit with the transmitting device 50 or the bait matrix tablets 269 within the pocket 281 to positively retain the transmitting device or tablets in the pocket. Standoff elements in the form of a plurality of nubs 285 (FIG. 20) are provided on the inner surface of the cup portion 271 at the closed end 275 of each of the cups 273 to extend into the respective pocket 281. The standoff elements 285 space the transmitting device 50 or tablets 269 from the closed ends 275 of the cups 273 to allow termites to move therebetween within the pocket 281. In a particularly suitable embodiment, the standoff elements 285 are provided by corresponding sockets 287 formed in the outer surface of the closed end 275 of each of the cups 273. These sockets 287 are configured and arranged to receive the spacing elements 249 that extend out from the inner surface 237 of the base panel 225 to allow the cartridge to seat sufficiently into the container 223 in the storage configuration of the termite station 221 so that the lid of the container can be closed.

Figure 19:
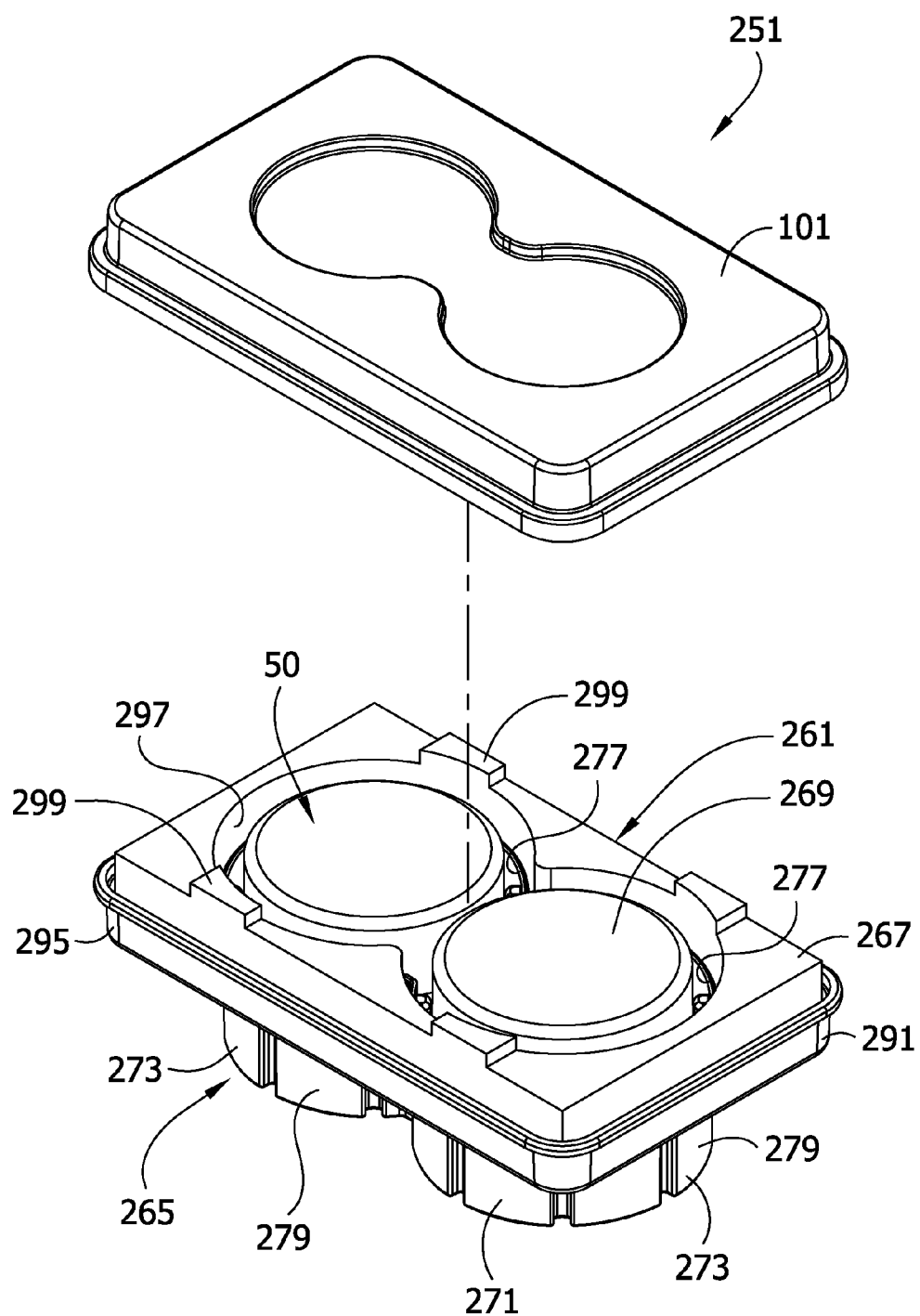
FIG. 19 is a perspective similar to FIG. 18 with the cartridge being only partially exploded.

Referring now to FIGS. 18 and 19, the cartridge holder 265 also has a generally rectangular tray portion 291 formed integrally with and extending around the cup portion 271 of the cartridge holder to receive, and more suitably to receive and retain the aggregation member 261 in the cartridge holder. A support panel 293 (e.g., bottom) of the illustrated tray portion 291 (which also includes a peripheral side wall 295 defining the depth of the tray portion) is suitably spaced lengthwise from the open ends 277 of the generally cylindrical cups 273 so that the aggregation member 261 held by the tray portion at least in part surrounds the cups in which the transmitting device 50 and the bait matrix 263 is disposed. It is contemplated, however, that the support panel 293 of the tray portion 291 may be located at substantially any position between the closed ends 275 and the open ends 277 of the cups 273.

In one particularly suitable embodiment, the aggregation member 261 and the tray portion 291 of the holder 265 are sized relative to each other to provide an interference or friction fit of the aggregation member in the tray portion to thereby retain the aggregation member in the holder. As best seen in FIG. 19, the heat-treated wood block 267 that defines the aggregation member 261 of the illustrated embodiment is generally rectangular and has a central opening 297 so that when seated in the tray portion 291 of the holder 265 the wood block surrounds the cups 273 of the cup portion 271 proximate the open ends 277 of the cups while leaving centrally exposed the transmitting device 50 and the bait matrix tablets 269.

Suitable spacing structure is provided to space at least a portion of the aggregation member 261 from the base panel 225 to permit termites to readily move between the aggregation member and the base panel. For example, in the illustrated embodiment of FIGS. 18 and 19, the spacing structure comprises four standoff elements 299 secured to and more particularly formed integrally with the heat-treated wood block 267. It is understood that more or less than the four illustrated standoff elements 299 may be provided. The spacing structure may alternatively be formed into the aggregation member 261, such as grooves, slots or other voids formed in the outer surface of the wood block 267, so that less than the entire outer surface of the wood block (e.g., where the grooves, etc. are located) lies against the base panel 225 in the operating configuration of the termite station 210. In other contemplated embodiments, suitable spacing structure may be formed integrally with the inner surface 237 of the base panel 225, or it may be formed separate from and attached thereto.

Figure 17:
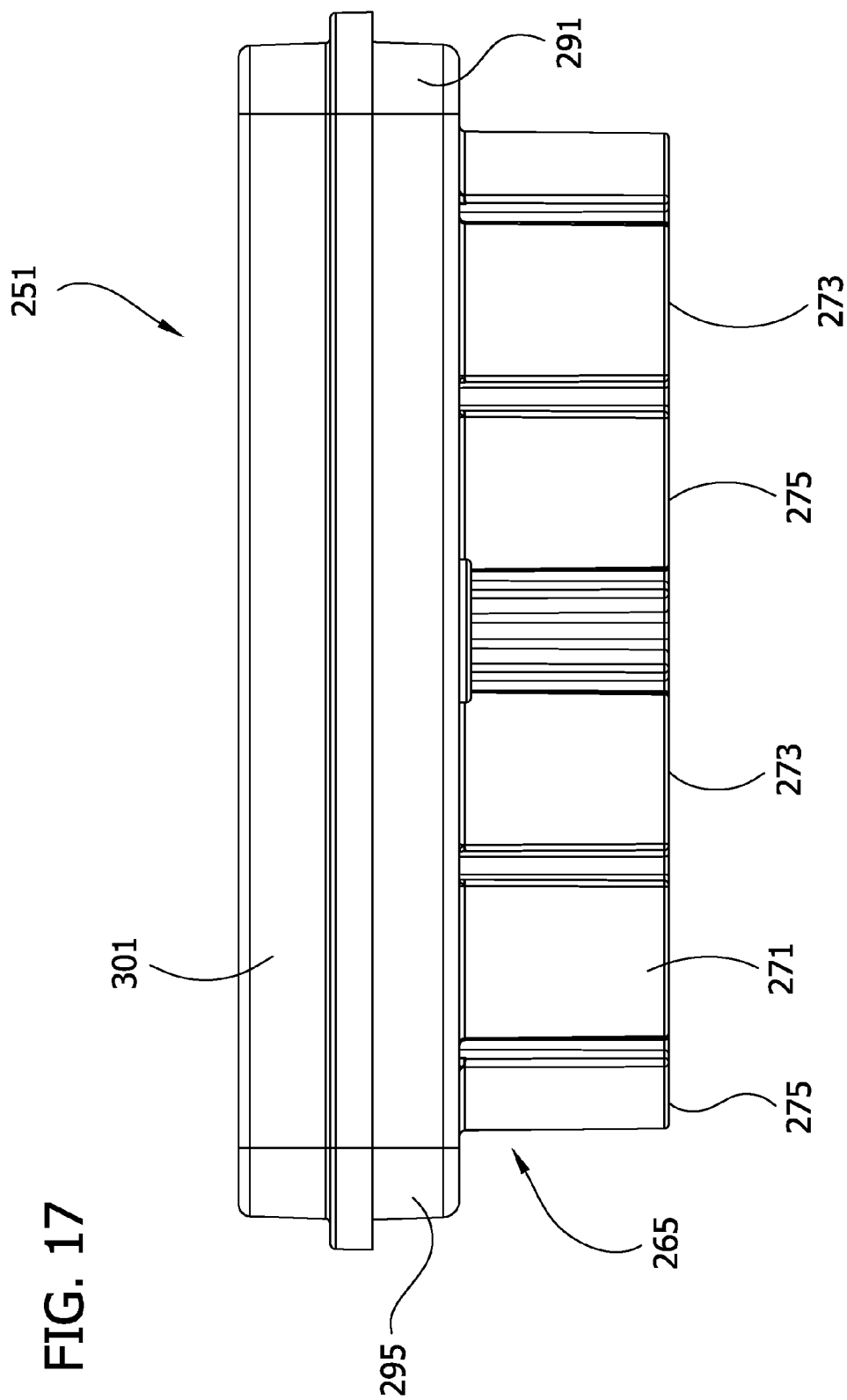
FIG. 17 is a front elevation of the cartridge of the insect monitoring and control station removed from the container.

As seen in FIGS. 17-19, the cartridge 251 may optionally comprise a cover 301 adapted for releasable securement to the aggregation member 261 and/or the cartridge holder 265, and more suitably to the peripheral side wall 295 of the tray portion 291 of the cartridge holder to define an interior space of the cartridge in which the aggregation member, transmitting device 50, and bait matrix 263 are disposed so as to reduce their exposure to air and other environmental conditions. It is understood that the cover 301 can be omitted from the cartridge 251.

With reference again to FIG. 10, in a storage configuration of the termite station 221, the cartridge 251 is disposed within the interior space 233 of the container 223 with the outer surfaces of the closed ends 275 of the cartridge holder cups 273 facing the inner surface 237 of the base panel 225 such that the cartridge cup portion sockets 281 receive the base panel spacing members 249 to position the cartridge within the container. The cover 301 of the cartridge 251 thus faces the lid 231 of the container 223 in this configuration with the lid in its closed position.

To mount the termite station 210 on a desired mounting surface, the container lid 231 is moved to its open position (FIG. 11) to provide access to the interior space 233 of the container 223 and the cartridge 251 is removed from the container (FIG. 12). With the lid 231 open and the cartridge 251 removed, the outer surface 235 of the base panel 225 is placed against the mounting surface and suitable fasteners are used (i.e., extending through the base panel openings 239) to secure the base panel (and hence the container 223) on the mounting surface.

To use the termite station 210 for repelling, attracting, monitoring, and/or controlling termites, the lid 231 is opened and the cartridge 251 is removed from the container 223. The cartridge cover 301 (if present) is removed from the cartridge 251 to expose the aggregation member 261, transmitting device 50, and bait matrix tablets 269. The cartridge 251 is re-inserted, open end first, into the container 223 so that the aggregation member 261 now faces the base panel 225 and is otherwise spaced from the base panel by the standoff elements 299 (broadly, spacing structure) and the transmitting device 50 and the bait matrix tablets 269 are spaced from the base panel by spacing elements 249.

The lid 231 is then secured in its closed position to fully enclose the cartridge 251 in the container 223, thereby defining the operating configuration of the termite station 221. The aggregation member 261 (e.g., the heat-treated wood block 267 in the illustrated embodiment), bait matrix 263 (e.g., the bait matrix tablets 269) and cartridge holder 265 are sized and configured relative to each other such that the aggregation member is nearer to the base panel 225 than the bait matrix and is also nearer both laterally and longitudinally to the peripheral openings 247 formed in the end and side panels 227, 229 than the bait matrix in the operating configuration of the termite station.

The leads 56 of the transmitting device 50, which extend outward from housing 254, are electrically fastened to the wiring 44 of the insect control system 10 using suitable electric fasteners. In operation, the transmitter 42 of the insect control system 10 is activated to send a signal via the wiring 44 to the station 210. If the station 210 is configured to repeal termites (i.e., operate as a repelling station 20 of FIG. 1), termites will not approach the station or the area of influence 46 around the station. In addition, any termites within the area of influence 46 will be driven away from the station. It is contemplated that the aggregation member 261 and the bait matrix 263 can be omitted in this configuration. It is also contemplated that more than one transmitting device 50 can be placed in the container 223.

If the station 210 is configured to attract termites (i.e., operate as an attracting station 40 of FIG. 1), termites will be drawn to the station and the area of influence 46 around the station. As termites are drawn to the station 210 by the electromagnetic field being emitted by the antenna 52 of the transmitting device 50, they can enter the container 223 through the openings 239 formed in the base panel or through the peripheral openings 247 formed in the end and/or side panels 227, 229 where the corresponding access panels removed. The placement and arrangement of the aggregation member 261 relative to the bait matrix 263 (i.e., nearer to the base panel 225, end panels 227 and side panels 229 than the bait matrix) results in the termites first encountering the aggregation member after entering the interior space 233 of the container 223. Where the aggregation member 261 is a non-physical attractant, such as the previously described heat-treated wood block 267, the termites may even be lured or drawn by the aggregation member into the termite station 221. The termites, induced by the aggregation member 261 to forage further within the container 223, ultimately discover and are induced to consume the bait matrix 263.

Where the bait matrix 263 is free from toxicant and is used for monitoring, the termites leave visual evidence of attacking the bait matrix, such as exploratory tunnels built by termites as they consume the bait material so that signs of termite infestation are left on the surface of the material, or mud tubing constructed across the surface of the material or into the cup portion of the cartridge holder. By adding toxicant to the bait matrix 263, foraging termites ingest the toxicant-containing bait and return portions of the bait to the nest through the pre-existing network of passageways, thereby effectively treating against the infestation.

It is expected that over time the need to replace the cartridge 251 will arise, such as following long periods of non-infestation and exposure to environmental conditions, or following prolonged periods of infestation in which a substantial amount of the bait matrix 263 (e.g., the tablets 269 of the illustrated embodiment) is consumed. The cartridge 251 may be replaced by opening the lid 231, removing the old cartridge (e.g., as a single unit) and inserting a new one that includes a new aggregation member 261, a new transmitting device 50, and new tablets 269. Alternatively, if a new transmitting device 50 is not needed, just the bait matrix 263 (e.g., the tablets 269) and/or the aggregation member 261 may be replaced in the old cartridge 251 and the old cartridge reinserted back into the container 223. Because the aggregation member 261, transmitting device 50, bait matrix 263 and holder 265 are held in assembly as a single unit, the entire cartridge 251 is readily replaced without having to reach into the termite station 210, i.e., only the cup portion 271 of the holder 265 need be grasped and pulled outward to remove the cartridge from the container 223.

Figure 21:
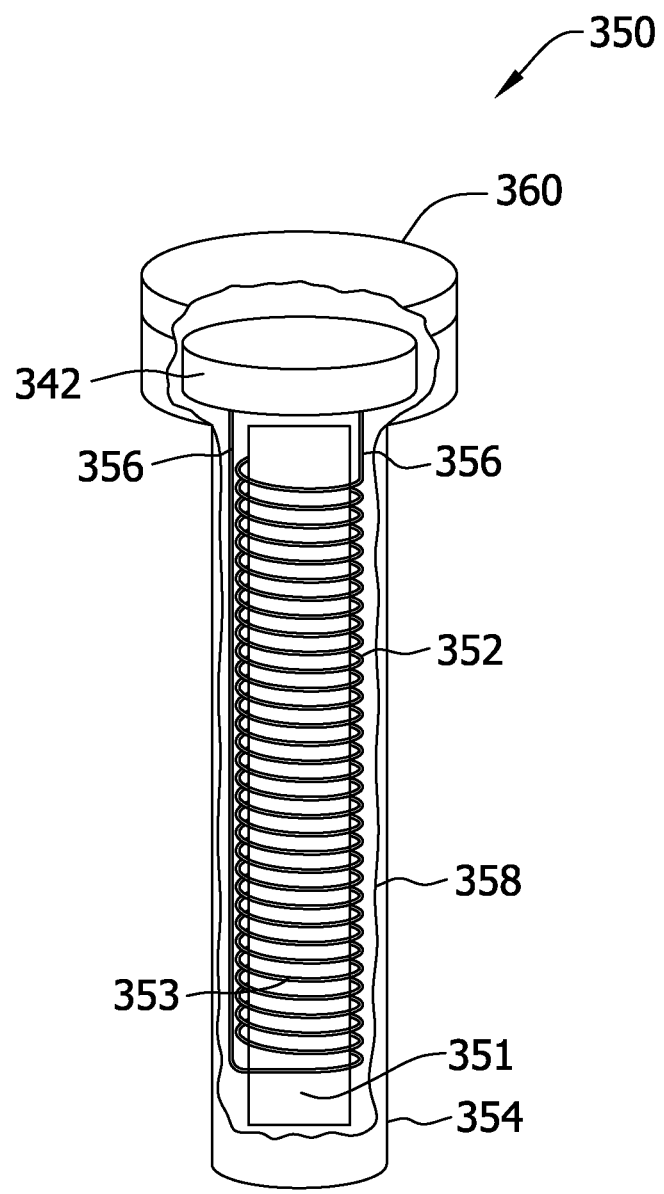
FIG. 21 is a perspective of another embodiment of a transmitting device of the pest control system, the device having a transmitter, an antenna and a housing encapsulating the antenna, portions of the housing being broken away to show the antenna.
Figure 22:
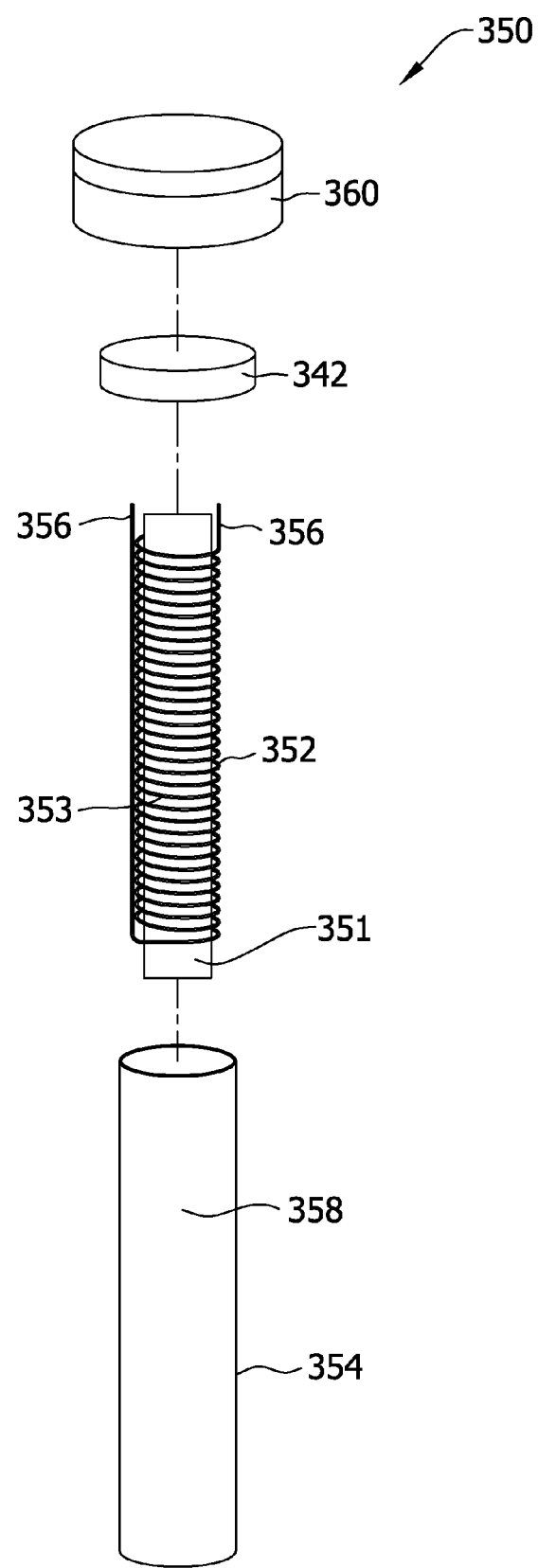
FIG. 22 is an exploded perspective of the transmitting device of FIG. 21.
Figure 23:
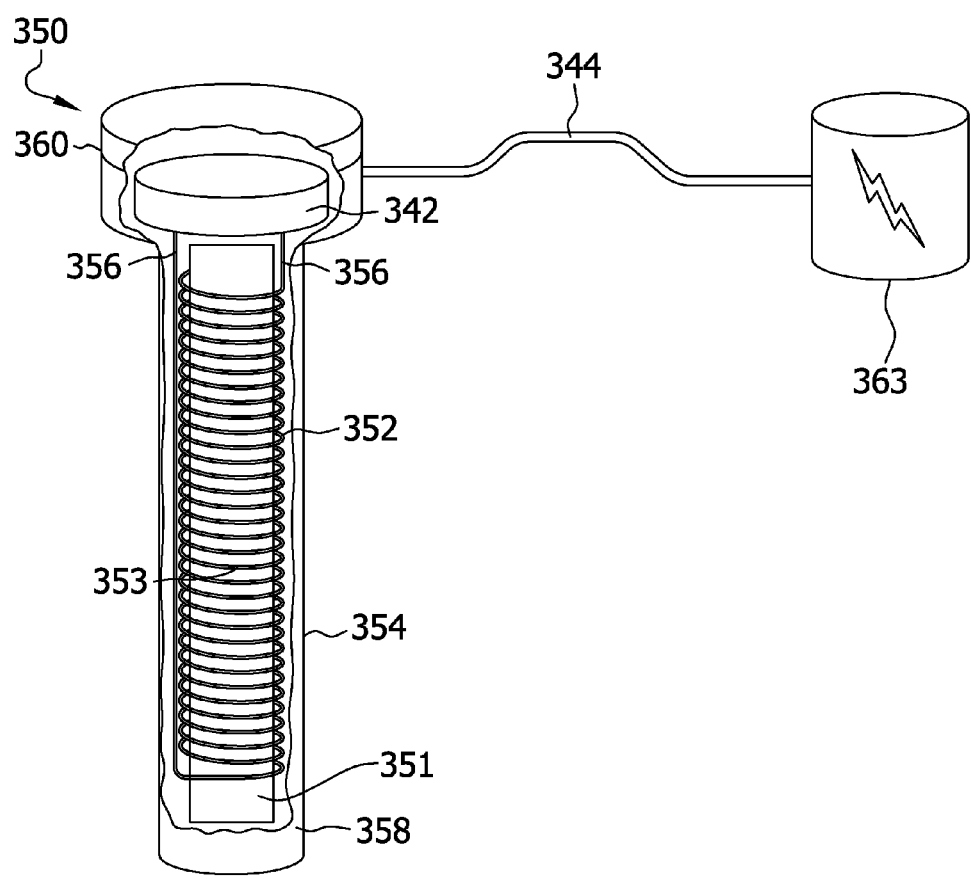
FIG. 23 is a schematic illustrating the transmitting device of FIG. 21 operatively connected to a power supply.

FIGS. 21-23 illustrate another embodiment of a suitable transmitting device 350. The transmitting device 350 includes an antenna 352 comprising a rod 351 and a coiled wire 353 wrapped around the rod. The antenna 352 is sealingly enclosed within a housing 354 having a tubular body 358 and a closure 360 removably attached to the body. FIG. 21 illustrates the closure 360 attached to the body 358 and FIG. 22 illustrates the closure removed from the body. The closure 360 can be removably attached to the body 358 in any suitable manner (e.g., threaded connection, snap-fit). It is also contemplated that the closure 360 can be hinged to the body 358 so that access to the antenna 352 can be gained without completely removing the closure from the body. In this embodiment, the closure 360 can be pivoted relative to the body 354 between a closed position wherein the antenna 352 is sealing enclosed by the housing 354 and an opened position wherein the antenna is at least partially exposed.

As seen in FIG. 21, a transmitter 342 is also sealed within the housing 354. In the illustrated embodiment, the transmitter 342 is sealed within the closure 360 of the housing 354 but it is understood that the transmitter can be sealed within the body 358. A pair of leads 356 extends between the body 358 and the closure 360 of the housing 354 to electrically coupling the antenna 352 to the transmitter. With reference to FIG. 23, a power supply 363 (i.e., a solar panel, rechargeable battery, disposable battery, standard outlet, generator) is operatively connected to the transmitting device 350 and transmitter 342 via wiring 344. It is contemplated that the power source (e.g., a disposable battery) can be sealed within housing along with the antenna 352 and transmitter 342.

The material from which the housing 354 is made is suitably selected to inhibit or minimize the effect the material has on the electromagnetic field being emitted from the antenna 352 and passing through the housing material. That is, the housing 354 is made from a material that will not effect or will only minimally effect an area of influence of the electromagnetic field. In one suitable example, the area of influence is reduced by less than 50% by the material of housing 354. In a particularly suitable embodiment, the area of influence is reduced by less than 25% by the material of housing 354. Suitably, the materials suitable for making the housing 354 are resistant water, humidity, corrosive or caustic conditions, and stray voltage. Examples of suitable materials from which the housing 354 may be made include (without limitation) polyethylene, propylene, isoprene, and butylenes (i.e., polyolefins).

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A method of controlling pests comprising:
    placing a pest control station in an area of interest, the pest control station having an internal chamber;
    placing a pest control apparatus within the internal chamber of the pest control station, the pest control apparatus having a holder;
    placing a transmitting device in the holder, the transmitting device being unsecured to the holder when positioned in the holder, the transmitting device comprising an antenna and a housing sealingly enclosing only the antenna therein, thereby substantially isolating the antenna from the ambient environment, the housing having a body defining an interior space for removable placement of the antenna and a closure hermetically sealing the interior space, the closure being positionable between a closed position in which the closure hermetically seals the interior space and an open position in which the antenna can be accessed;
    positioning the closure in the open position to access the interior space of the housing;
    placing the antenna in the interior space of the housing;
    positioning the closure in the closed position to hermetically seal the interior space; and
    activating the antenna of the transmitting device to emit an electromagnetic field to define a region of influence wherein the electromagnetic field is emitted, the housing of the transmitting device being made from a material that reduces the region of influence of the antenna by less than 50%.

2. The method of claim 1 wherein the activating the antenna of the transmitting device to emit the electromagnetic field comprises activating the antenna to emit an electromagnetic field adapted to electromagnetically repel insects away from the pest control apparatus.

3. The method of claim 2 wherein the placing the pest control station within the area of interest comprises placing a plurality of pest control stations around a perimeter of a house to repel insects away from the house.

4. The method of claim 1 wherein the activating the antenna of the transmitting device to emit the electromagnetic field comprises activating the antenna to emit an electromagnetic field adapted to electromagnetically attract insects to the pest control apparatus.

5. The method of claim 4 further comprising monitoring the pest control apparatus for the presence of insects.

6. The method of claim 5 further comprising baiting the pest control apparatus with a toxicant containing bait.

7. The method of claim 1 wherein the placing the pest control apparatus within the internal chamber of the pest control station comprises placing the pest control apparatus within the internal chamber of the pest control station, the pest control apparatus further comprising a signal transmitter and a power supply.

8. The method of claim 7 wherein the signal transmitter and the power supply are sealingly enclosed within the housing.

9. The method of claim 1 wherein a threaded connection removably attaches the closure to the body.

10. The method of claim 1 wherein the closure is hinged to the body so the closure remains at least partially attached to the body in the open position.

11. The method of claim 1 wherein the body has a sidewall, a rim, and a plurality of recesses in the sidewall near the rim, the closure having a plurality of flanges for insertion into the plurality of recesses.

12. The method of claim 1 wherein the housing of the transmitting device is made from a material that reduces the region of influence of the antenna by less than 25%.

13. The method of claim 1 further comprising placing a bait matrix in the holder, the holder configured for holding both the transmitting device and the bait matrix at least partly within the holder when the pest control apparatus is outside the pest control station.

14. A method of controlling pests comprising:
placing a pest control station in an area of interest, the pest control station having an internal chamber;
placing a pest control apparatus within the internal chamber of the pest control station, the pest control apparatus having a holder for holding both a transmitting device and a bait matrix at least partly within the holder when the pest control apparatus is outside the pest control station;
placing the transmitting device in the holder, the transmitting device including an antenna and a housing hermetically sealing the antenna therein, the housing having a body defining an interior space for removable placement of the antenna and a closure hermetically sealing the interior space, the closure being positionable between a closed position in which the closure hermetically seals the interior space and an open position in which the antenna can be accessed, the transmitting device being unsecured to the holder when positioned in the holder;
placing the bait matrix in the holder;
positioning the closure in the open position to access the interior space of the housing;
placing the antenna in the interior space of the housing, the housing having only the antenna therein;
positioning the closure in the closed position to hermetically seal the interior space; and
activating the antenna of the transmitting device to emit an electromagnetic field.

15. The method of claim 14 wherein the closure is hinged to the body so the closure remains at least partially attached to the body in the open position.

16. The method of claim 14 wherein the housing tightly encloses a single antenna.

17. The method of claim 14 wherein the activating the antenna of the transmitting device to emit the electromagnetic field comprises activating the antenna to emit an electromagnetic field adapted to electromagnetically repel insects away from the pest control apparatus.

18. The method of claim 17 wherein the placing the pest control station within the area of interest comprises placing a plurality of pest control stations around a perimeter of a house to repel insects away from the house.

19. The method of claim 17 wherein the placing the pest control station within the area of interest comprises placing a plurality of pest control stations at locations spaced from a house to attract insects away from the house.

20. The method of claim 14 wherein the activating the antenna of the transmitting device to emit the electromagnetic field comprises activating the antenna to emit an electromagnetic field adapted to electromagnetically attract insects to the pest control apparatus.

\* \* \* \* \*